US012748359B2

(12) United States Patent
Kagawa et al.

(10) Patent No.: US 12,748,359 B2
(45) Date of Patent: Sep. 29, 2026

(54) TONER

(71) Applicant: CANON KABUSHIKI KAISHA, Tokyo (JP)

(72) Inventors: Hiroki Kagawa, Shizuoka (JP); Tomohisa Sano, Shizuoka (JP); Kosuke Fukudome, Tokyo (JP); Tohru Hiramatsu, Shizuoka (JP); Atsuhiko Ohmori, Kanagawa (JP); Kazuyuki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 443 days.

(21) Appl. No.: 18/418,635

(22) Filed: Jan. 22, 2024

(65) Prior Publication Data

US 2024/0264544 A1 Aug. 8, 2024

(30) Foreign Application Priority Data

Jan. 26, 2023 (JP) ................................ 2023-010019

(51) Int. Cl.

| | |
|---|---|
| ***G03G 9/097*** | (2006.01) |
| ***G03G 9/08*** | (2006.01) |
| ***G03G 9/087*** | (2006.01) |

(52) U.S. Cl.

CPC ....... *G03G 9/09725* (2013.01); *G03G 9/0821* (2013.01); *G03G 9/08755* (2013.01)

(58) Field of Classification Search

CPC ........... G03G 9/09708; G03G 9/09716; G03G 9/09791

See application file for complete search history.

(56) References Cited

U.S. PATENT DOCUMENTS 7,582,401 B2 9/2009 Ogawa
7,678,523 B2 3/2010 Hiroko (Continued)

FOREIGN PATENT DOCUMENTS

JP H10-090941 * 4/1998 ............. G03G 9/083
JP 2001-356521 A 12/2001
JP 6059251 B2 1/2017

OTHER PUBLICATIONS

Translation of JP H10-090941.*
U.S. Appl. No. 18/418,622, filed Jan. 22, 2024, Kosuke Fukudome.
U.S. Appl. No. 18/418,782, filed Jan. 22, 2024, Atsuhiko Ohmori.

*Primary Examiner* — Peter L Vajda
(74) *Attorney, Agent, or Firm* — VENABLE LLP

(57) ABSTRACT

The present invention provides a toner which can form a stable image even in a low print intermittent mode under a low-temperature and low-humidity environment, while having excellent charge rising property. A toner includes a toner particle and a silica fine particle A, wherein (I) in TOF-SIMS measurement of the toner particle, a fragment peak derived from a boron atom and a fragment peak derived from a BO structure are detected, and the toner contains dodecylbenzenesulfonic acid or a dodecylbenzenesulfonate; (II) in TOF-SIMS measurement of the silica fine particle A, a fragment ion is observed which corresponds to a dimethylsiloxane structure; when 2.00 g of the silica fine particle is dispersed in a mixed liquid of 25.0 g of ethanol and 75.0 g of an aqueous solution of 20% by mass of NaCl, and the dispersion is subjected to a titration operation which uses sodium hydroxide, Sn defined by $Sn=[(a-b)\times c\times NA]/(d\times e)$ satisfies $0.10\leq Sn\leq 0.80$.

11 Claims, 1 Drawing Sheet

(56) References Cited

U.S. PATENT DOCUMENTS

| | | | |
|---|---|---|---|
| 7,678,524 | B2 | 3/2010 | Hasegawa |
| 7,923,190 | B2 | 4/2011 | Magome |
| 7,935,467 | B2 | 5/2011 | Dojo |
| 8,227,162 | B2 | 7/2012 | Sano |
| 8,426,091 | B2 | 4/2013 | Magome |
| 8,426,094 | B2 | 4/2013 | Magome |
| 8,518,620 | B2 | 8/2013 | Dojo |
| 8,614,044 | B2 | 12/2013 | Matsui |
| 8,778,585 | B2 | 7/2014 | Matsui |
| 8,841,054 | B2 | 9/2014 | Dojo |
| 8,883,389 | B2 | 11/2014 | Matsui |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,152,065 | B2 | 10/2015 | Sano |
| 9,213,250 | B2 | 12/2015 | Nomura |
| 9,213,251 | B2 | 12/2015 | Ohmori |
| 9,235,151 | B2 | 1/2016 | Tanaka |
| 9,239,528 | B2 | 1/2016 | Hasegawa |
| 9,256,148 | B2 | 2/2016 | Fujikawa |
| 9,261,806 | B2 | 2/2016 | Moribe |
| 9,285,697 | B2 | 3/2016 | Fukudome |
| 9,304,422 | B2 | 4/2016 | Matsui |
| 9,348,246 | B2 | 5/2016 | Magome |
| 9,354,545 | B2 | 5/2016 | Matsui |
| 9,377,708 | B2 | 6/2016 | Magome |
| 9,442,416 | B2 | 9/2016 | Magome |
| 9,470,993 | B2 | 10/2016 | Nishikawa |
| 9,551,947 | B2 | 1/2017 | Hiroko |
| 9,594,323 | B2 | 3/2017 | Fujikawa |
| 9,606,462 | B2 | 3/2017 | Nomura |
| 9,804,514 | B2 | 10/2017 | Suzumura |
| 9,804,519 | B2 | 10/2017 | Suzumura |
| 9,841,692 | B2 | 12/2017 | Hasegawa |
| 9,880,478 | B2 | 1/2018 | Shimano |
| 9,927,728 | B2 | 3/2018 | Arimura |
| 9,946,179 | B2 | 4/2018 | Arimura |
| 9,946,181 | B2 | 4/2018 | Hasegawa |
| 9,964,874 | B2 | 5/2018 | Suzumura |
| 9,964,881 | B2 | 5/2018 | Ikejiri |
| 9,971,262 | B2 | 5/2018 | Hasegawa |
| 9,971,263 | B2 | 5/2018 | Fukudome |
| 9,971,264 | B2 | 5/2018 | Sano |
| 10,012,923 | B2 | 7/2018 | Sano |
| 10,101,683 | B2 | 10/2018 | Nishikawa |
| 10,151,990 | B2 | 12/2018 | Suzuki |
| 10,197,934 | B2 | 2/2019 | Matsui |
| 10,228,627 | B2 | 3/2019 | Nagashima |
| 10,241,430 | B2 | 3/2019 | Kimura |
| 10,289,016 | B2 | 5/2019 | Fukudome |
| 10,295,920 | B2 | 5/2019 | Nishikawa |
| 10,295,921 | B2 | 5/2019 | Ohmori |
| 10,303,075 | B2 | 5/2019 | Tanaka |
| 10,310,397 | B2 | 6/2019 | Sano |
| 10,545,420 | B2 | 1/2020 | Kinumatsu |
| 10,698,327 | B2 | 6/2020 | Nagashima |
| 10,747,134 | B2 | 8/2020 | Watanabe |
| 10,768,540 | B2 | 9/2020 | Watanabe |
| 10,845,722 | B2 | 11/2020 | Nishikawa |
| 10,859,933 | B2 | 12/2020 | Kinumatsu |
| 10,877,387 | B2 | 12/2020 | Fukudome |
| 10,969,704 | B2 | 4/2021 | Kagawa |
| 11,003,103 | B2 | 5/2021 | Kinumatsu |
| 11,079,695 | B2 | 8/2021 | Sato |
| 11,092,905 | B2 | 8/2021 | Fukudome |
| 11,099,493 | B2 | 8/2021 | Komiya |
| 11,112,709 | B2 | 9/2021 | Saeki |
| 11,112,713 | B2 | 9/2021 | Akiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,846 | B2 | 11/2021 | Kinumatsu |
| 11,333,989 | B2 | 5/2022 | Unno |
| 11,415,902 | B2 | 8/2022 | Watanabe |
| 11,796,930 | B2 | 10/2023 | Watanabe |
| 11,809,132 | B2 | 11/2023 | Nagashima |
| 11,835,874 | B2 | 12/2023 | Sato |
| 2017/0010549 | A1* | 1/2017 | Bejat .................. G03G 9/09385 |
| 2022/0026823 | A1 | 1/2022 | Sano |
| 2022/0146952 | A1 | 5/2022 | Komiya |
| 2022/0146955 | A1 | 5/2022 | Nozaki |
| 2022/0171302 | A1 | 6/2022 | Sato |
| 2022/0171303 | A1 | 6/2022 | Hiramatsu |
| 2022/0206402 | A1 | 6/2022 | Uratani |
| 2022/0214630 | A1 | 7/2022 | Kamikura |
| 2022/0373906 | A1 | 11/2022 | Ohmori |
| 2022/0373916 | A1 | 11/2022 | Adachi |
| 2023/0014130 | A1 | 1/2023 | Sano |
| 2023/0117448 | A1 | 4/2023 | Fukudome |
| 2023/0122974 | A1 | 4/2023 | Kagawa |
| 2023/0161277 | A1 | 5/2023 | Komiya |
| 2023/0273538 | A1 | 8/2023 | Fukudome |
| 2023/0273540 | A1 | 8/2023 | Toyoda |
| 2023/0314974 | A1 | 10/2023 | Tsuda |
| 2023/0408942 | A1 | 12/2023 | Kagawa |
| 2023/0408945 | A1 | 12/2023 | Shibahara |
| 2023/0408946 | A1 | 12/2023 | Sato |
| 2024/0036489 | A1 | 2/2024 | Arimura |
| 2024/0053691 | A1 | 2/2024 | Kamikura |
| 2024/0061355 | A1 | 2/2024 | Komiya |
| 2024/0069457 | A1 | 2/2024 | Murayama |

* cited by examiner

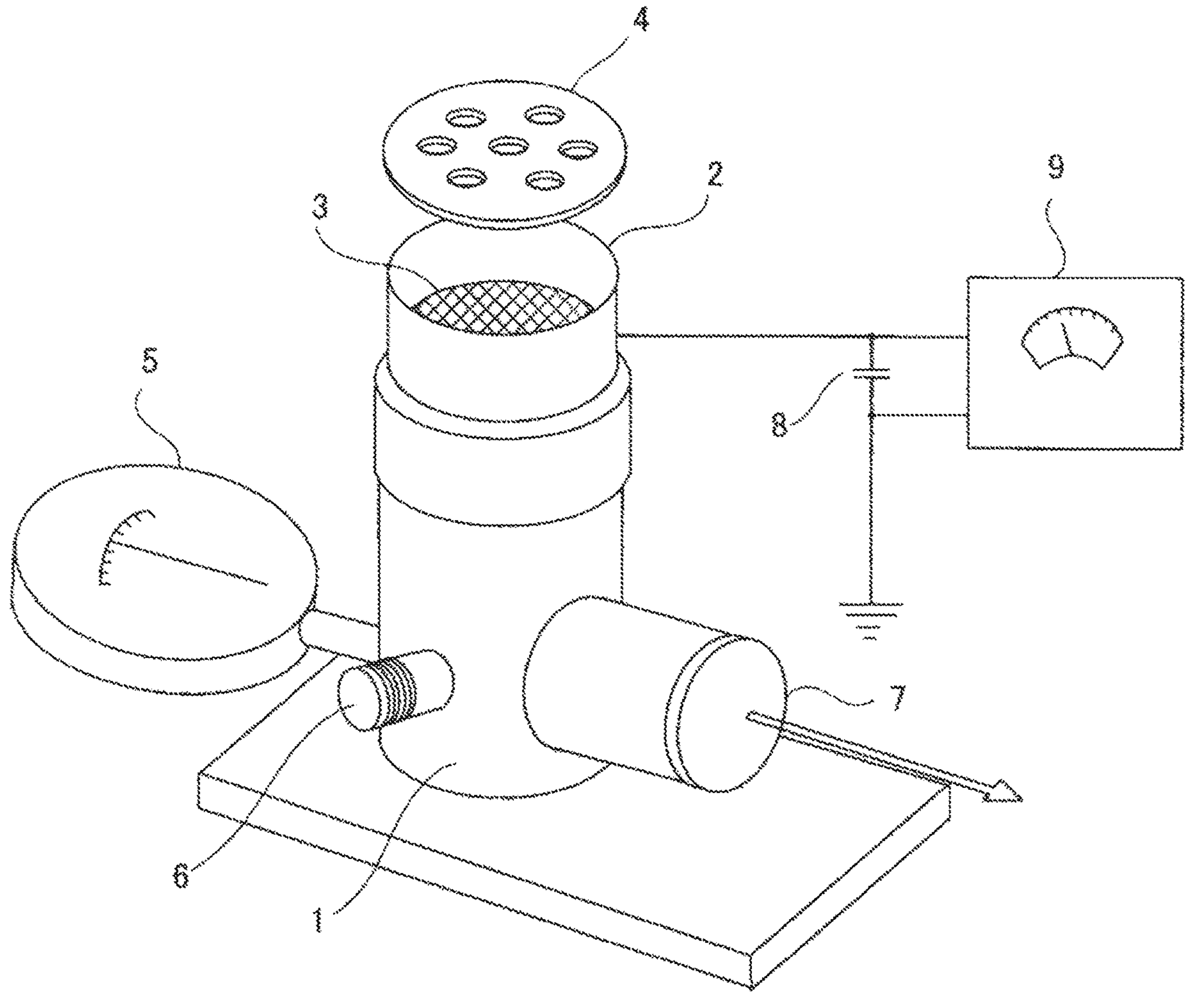
4
2
3
9
5
8
7
6
1

TONER

BACKGROUND OF THE INVENTION

Field of the Invention

The present invention relates to a toner used in an image forming method such as an electrophotographic method.

Description of the Related Art

In recent years, image forming apparatuses such as copying machines and printers are required to have a higher speed and a higher image quality, as a purpose of use and an environment of use have been diversified. In order to achieve both the higher speed and the higher image quality at the same time, a charge rising property of a toner is important. The charge rising property of the toner can be improved by enhancement of the chargeability and fluidity of the toner.

For the purpose of improving the chargeability of the toner, Japanese Patent Application Laid-Open No. 2001-356521 proposes to arrange an external additive on the surface of the toner, which has high chargeability and fluidity such as silica treated with dimethyldichlorosilane.

In addition, from the viewpoint of durability, an approach of improving glossiness and fixability has been also made. For example, Japanese Patent No. 6059251 also proposes a toner which uses a borax coupling.

The above external additive as disclosed in Japanese Patent Application Laid-Open No. 2001-356521 can provide an excellent charge rising property, but it becomes difficult to control the chargeability depending on a type of usage. For example, in a case where a mode (hereinafter, referred to as a low print intermittent mode) is applied in which a type of usage of a personal printer is supposed in which a printing rate is low and the number of sheets printed at a time is small, the toner has many opportunities of being charged, and accordingly, the chargeability tends to be easily excessive. This tendency is remarkable in the low print intermittent mode particularly under a low-temperature and low-humidity environment. When the chargeability of the toner becomes excessive, a rapid decrease in the chargeability occurs when the toner is mixed with a toner having low chargeability, which is supplied to a developing member afterwards, and accordingly, a phenomenon called "density unevenness in longitudinal direction" occurs in which a part of an image results in being thinned in a longitudinal band shape.

In addition, in Japanese Patent No. 6059251, an effect of improving the charge rising property is insufficient, and there is room for improvement including a performance under the low-temperature and low-humidity environment.

The present invention has been made in view of the above problems, and is directed to providing a toner that has the excellent charge rising property and can form a stable image even in the low print intermittent mode under the low-temperature and low-humidity environment.

SUMMARY OF THE INVENTION

The present invention relates to a toner comprising: a toner particle comprising a binder resin; and a silica fine particle A, wherein (I) in TOF-SIMS measurement of the toner particle, a fragment peak derived from a boron atom and a fragment peak derived from a boron-oxygen structure are detected, and the toner comprises at least one selected from the group consisting of dodecylbenzenesulfonic acid and a dodecylbenzenesulfonate;

(II) in measurement of the silica fine particle A by time-of-flight type secondary ion mass spectrometry, a fragment ion is observed which corresponds to a structure shown by the following Formula (1),

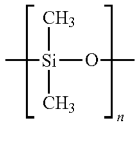

(1)

(wherein n represents an integer of 1 or more);

when 2.00 g of the silica fine particle is dispersed in a mixed liquid of 25.0 g of ethanol and 75.0 g of an aqueous solution of 20% by mass of NaCl, and the dispersion is subjected to a titration operation which uses sodium hydroxide, Sn defined by $Sn=[(a-b)\times c\times NA]/(d\times e)$ satisfies the following Expression (2), $0.10\leq Sn\leq 0.80$ . . . (2), (wherein a is a titration amount (L) of an aqueous solution of NaOH necessary for adjusting the mixed liquid in which the silica fine particle is dispersed, to pH 9.0, b is the titration amount (L) of the aqueous solution of NaOH necessary for adjusting the mixed liquid of 25.0 g of ethanol and 75.0 g of the aqueous solution of 20% by mass of NaCl, to pH 9.0, c is a concentration (mol/L) of the aqueous solution of NaOH used for the titration, NA is Avogadro's number, d is a mass (g) of the silica fine particle, and e is a BET specific surface area ($nm^2/g$) of the silica fine particle);

in a chemical shift of the silica fine particle A obtained by a solid-state $^{29}Si$-NMR DD/MAS method, when $D_{DD}$ represents a peak area of a D unit having a peak top in a range of −25 ppm to −15 ppm, $S_{DD}$ represents a sum of peak areas of an M unit, a D unit, a T unit and a Q unit in a range of −140 ppm to 100 ppm, and B ($m^2/g$) represents a BET specific surface area of the silica fine particle, a value $(D_{DD}/S_{DD})/B$ of a ratio of $(D_{DD}/S_{DD})$ to B is from $4.70\times10^{-6}$ to $1.40\times10^{-3}$; and furthermore in a chemical shift of the silica fine particle A obtained by a solid-state $^{29}Si$-NMR CP/MAS method, when $D_{CP}$ represents the peak area of the D unit having a peak top in the range of −25 ppm to −15 ppm, and $S_{CP}$ represents a sum of peak areas of the M unit, the D unit, the T unit and the Q unit in a range of −140 ppm to 100 ppm, a value $(D_{CP}/S_{CP})/B$ of a ratio of $(D_{CP}/S_{CP})$ to B is from $4.70\times10^{4}$ to $1.00\times10^{-2}$, and a value $(D_{CP}/S_{CP})/(D_{DD}/S_{DD})$ of a ratio of $(D_{CP}/S_{CP})$ to $(D_{DD}/S_{DD})$ is from 3.00 to $3.00\times10^{2}$.

Further features of the present invention will become apparent from the following description of exemplary embodiments with reference to the attached drawing.

BRIEF DESCRIPTION OF THE DRAWINGS

FIGURE is a view illustrating a configuration of an apparatus that is used for measurement of a triboelectric charge amount of a toner.

DESCRIPTION OF THE EMBODIMENTS

The description "XX or more and YY or less" or "from XX to YY" representing a numerical range means a numerical range including a lower limit and an upper limit that are end points unless otherwise stated. In a case where numerical ranges are described in a stepwise manner, upper and lower limits of each numerical range can be arbitrarily combined.

Features of the Invention

In order to enhance a charge rising property of a toner, it is effective to allow a silica fine particle having high chargeability and fluidity to exist on a surface of the toner, as an external additive. However, when such a silica fine particle is simply externally added, an chargeability of the toner becomes excessive and a density unevenness in a longitudinal direction becomes a problem, in a case where the toner is used in a low print intermittent mode under a low-temperature and low-humidity environment. In order to solve the above problems, the present inventors have intensively studied an appropriately controlled state of the surface of a silica fine particle and a surface of a toner base particle.

As a result, it has been found that excessive electrostatic charging can be suppressed while the high charge rising property of the silica fine particle is maintained, by a combination of a silica fine particle that is appropriately treated with a surface treatment agent which imparts a dimethylsiloxane structure and has a controlled amount of surface silanol groups, and a toner particle that has a dodecylbenzenesulfonic acid structure on the surface and further has a BO bond (boron-oxygen bond).

A detailed configuration of a toner of the present invention, which comprises a toner particle comprising a binder resin and a silica fine particle A, is as follows.

(I) in TOF-SIMS measurement of the toner particle, a fragment peak derived from a boron atom and a fragment peak derived from a BO structure (boron-oxygen structure) are detected, and the toner comprises at least one selected from the group consisting of dodecylbenzenesulfonic acid and a dodecylbenzenesulfonate;

(II) in measurement of the silica fine particle A by time-of-flight type secondary ion mass spectrometry, a fragment ion is observed which corresponds to a structure shown by the following Formula (1),

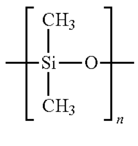

(1)

(wherein n represents an integer of 1 or more);

when 2.00 g of the silica fine particle is dispersed in a mixed liquid of 25.0 g of ethanol and 75.0 g of an aqueous solution of 20% by mass of NaCl, and the dispersion is subjected to a titration operation which uses sodium hydroxide, Sn defined by $Sn=[(a-b)\times c\times NA]/(d\times e)$ satisfies the following Expression (2), $0.10\leq Sn\leq 0.80$ . . . (2), (wherein a is a titration amount (L) of an aqueous solution of NaOH necessary for adjusting the mixed liquid in which the silica fine particle A is dispersed, to pH 9.0, b is the titration amount (L) of the aqueous solution of NaOH necessary for adjusting the mixed liquid of 25.0 g of ethanol and 75.0 g of the aqueous solution of 20% by mass of NaCl, to pH 9.0, c is a concentration (mol/L) of the aqueous solution of NaOH used for the titration, NA is Avogadro's number, d is a mass (g) of the silica fine particle, and e is a BET specific surface area ($nm^2$/g) of the silica fine particle);

in a chemical shift of the silica fine particle A obtained by a solid-state $^{29}$Si-NMR DD/MAS method, when $D_{DD}$ represents a peak area of a D unit having a peak top in a range of −25 ppm to −15 ppm, $S_{DD}$ represents a sum of peak areas of an M unit, a D unit, a T unit and a Q unit in a range of −140 ppm to 100 ppm, and B ($m^2$/g) represents a BET specific surface area of the silica fine particle, a value $(D_{DD}/S_{DD})/B$ of a ratio of $(D_{DD}/S_{DD})$ to B is from $4.70\times10^{-6}$ to $1.40\times10^{-3}$; and furthermore in a chemical shift of the silica fine particle A obtained by a solid-state $^{29}$Si-NMR CP/MAS method, when $D_{CP}$ represents the peak area of the D unit having a peak top in the range of −25 ppm to −15 ppm, and $S_{CP}$ represents a sum of peak areas of the M unit, the D unit, the T unit and the Q unit in a range of −140 ppm to 100 ppm, a value $(D_{CP}/S_{CP})/B$ of a ratio of $(D_{CP}/S_{CP})$ to B is from $4.70\times10^{-4}$ to $1.00\times10^{-2}$, and a value $(D_{CP}/S_{CP})/(D_{DD}/S_{DD})$ of a ratio of $(D_{CP}/S_{CP})$ to $(D_{DD}/S_{DD})$ is from 3.00 to $3.00\times10^{2}$.

The present inventors consider the reason why the effect as described above is obtained by the present configuration, in the following way.

Firstly, the BO bond and dodecylbenzenesulfonic acid or a dodecylbenzenesulfonate exist on the surface of the toner of the present invention. The BO bond is a functional group having high adsorptivity with a water content, and is considered to retain the water content on the toner surface to some extent, even in an environment in which the water content is small as in a low-temperature and low-humidity environment. Furthermore, the dodecylbenzenesulfonic acid or the dodecylbenzenesulfonate is water-soluble, and accordingly, migrates into the water content retained on the toner surface and becomes movable in the toner surface containing the water content. Then, a sulfonic acid moiety in the dodecylbenzenesulfonic acid structure electrostatically adsorbs to a silanol group on the surface of the silica fine particle having the other polarity, in the present invention. As a result, it is considered that the excessive charge of silica becomes easily leaked into surrounding water contents or the like, through the dodecylbenzenesulfonic acid or the dodecylbenzenesulfonate, and the excessive electrostatic charging has been capable of being suppressed.

In addition, in order to control adsorption between the sulfonic acid moiety of dodecylbenzenesulfonic acid or dodecylbenzenesulfonate and the silanol group while maintaining the chargeability and fluidity of silica, it is considered to be important to set the amount of treatment with the surface treatment agent which imparts the dimethylsiloxane structure and an amount of the surface silanol group to appropriate values.

The present invention will be described in more detail below.

In the toner of the present invention, a boron atom exists on the toner surface. Specifically, in time-of-flight secondary ion mass spectrometry (hereinafter referred to as TOF-SIMS) measurement of the toner, a fragment peak exists that is derived from the boron atom. The TOF-SIMS is a method of analyzing a composition of a sample surface, by irradiating a sample with an ion and analyzing a mass of a secondary ion which is emitted from the sample. The secondary ion is emitted from a region several nanometers deep from the sample surface, and accordingly, a region several nanometers deep from the toner surface can be qualitatively measured. The presence or absence of the boron atom is determined in advance by the TOF-SIMS, while sodium tetraborate decahydrate produced by Fujifilm Wako Pure Chemical Corporation is used as a standard sample. On measured data, a peak position is confirmed in advance, which is derived from the boron atom and $BO_2$ (a typical structure having a BO bond). After that, a target toner is subjected to the TOF-SIMS measurement, and thereby, the presence or absence of the boron atom and the BO bond can be known. When there is no boron atom and BO bond, the effect of the present invention cannot be obtained.

The toner of the present invention has dodecylbenzenesulfonic acid or a dodecylbenzenesulfonate. For information, the measurement of dodecylbenzenesulfonic acid will be described in detail later, but ESI-MS measurement can be used to know whether dodecylbenzenesulfonic acid exists in the vicinity of the surface, and further to know its content in the toner. When there is not dodecylbenzenesulfonic acid or a dodecylbenzenesulfonate, the effect of the present invention cannot be obtained as in the case of the BO bond.

The toner of the present invention has the silica fine particle A as the external additive. The silica fine particle A is surface-treated, which can be confirmed by TOF-SIMS. In the measurement of the silica fine particle A by TOF-SIMS, it is necessary that a fragment ion corresponding to the structure shown by the Formula (1) is observed. The observation of the fragment ion shown by the Formula (1) indicates that the silica fine particle A is surface-treated with the surface treatment agent that imparts the dimethylsiloxane structure. In addition, the dimethylsiloxane structure shows hydrophobicity, and accordingly, the adsorptivity with a water content and the chargeability can be controlled, by controlling the surface treatment state by the surface treatment agent which imparts the dimethylsiloxane structure.

(1)

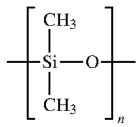

(wherein n is an integer of 1 or more).

As described above, the TOF-SIMS is a method of analyzing the composition of the sample surface, by irradiating the sample with the ion and analyzing a mass of the secondary ion which is emitted from the sample. The secondary ion is emitted from a region several nanometers deep from the sample surface, and accordingly the structure in the vicinity of the surface of the silica fine particle can be analyzed. A mass spectrum of the secondary ion obtained by the measurement is a fragment ion which reflects the molecular structure of the surface treatment agent for the silica fine particle.

In the silica fine particle A, a fragment ion corresponding to the structure shown by the Formula (1) is observed in the measurement by the TOF-SIMS. In the present disclosure, a structural unit having this structure is defined as a D unit. A fragment ion of the D unit being observed by the TOF-SIMS means that the silica fine particle is surface-treated with the surface treatment agent which imparts the D unit.

When the silica fine particle A is dispersed in a solvent, and the dispersion is subjected to a titration operation which uses sodium hydroxide, the amount of sodium hydroxide necessary for adjusting the pH to a target pH corresponds to the amount of the silanol group on the surface of the silica fine particle base and the silanol group in the surface-treated structure of the silica fine particle. In other words, the amount of Si—OH group can be evaluated by a value Sn (number/$nm^2$) which is obtained from a titration amount of the aqueous solution of sodium hydroxide. This is because Si—OH of a base of the silica fine particle and the Si—OH group derived from the surface treatment agent cause a neutralization reaction with sodium hydroxide. It is considered that because the silanol group has polarity, the chargeability of the silica fine particle is controlled by a content of the silanol group. If the content of the silanol group is small, the chargeability decreases. In addition, if the content of the silanol group is excessive, the toner tends to be easily excessively charged.

Specifically, when 2.00 g of the silica fine particle A is dispersed in a mixed liquid of 25.0 g of ethanol and 75.0 g of an aqueous solution of 20% by mass of NaCl, and the dispersion is subjected to the titration operation which uses sodium hydroxide, it is necessary that Sn defined by $Sn=[(a-b)\times c\times NA]/(d\times e)$ satisfies the following Expression (2):

$$0.10 \leq Sn \leq 0.80 \ \ldots, \quad (2)$$

(wherein a is a titration amount (L) of the aqueous solution of NaOH necessary for adjusting the mixed liquid in which the silica fine particle A is dispersed, to pH 9.0, b is the titration amount (L) of the aqueous solution of NaOH necessary for adjusting the mixed liquid of 25.0 g of ethanol and 75.0 g of the aqueous solution of 20% by mass of NaCl, to pH 9.0, c is a concentration (mol/L) of the aqueous solution of NaOH used for the titration, NA is Avogadro's number, d is a mass (g) of the silica fine particle, and e is a BET specific surface area ($nm^2$/g) of the silica fine particle.).

Sn is obtained by the above titration operation. It is considered that when the silanol group is present on the surface of the silica fine particle, the silanol group is immediately neutralized by sodium hydroxide, and accordingly Sn correlates with the silanol group per unit surface area of the surface of the silica fine particle. Due to Sn satisfying the Expression (2), the amount of the silanol group on the surface of the silica fine particle base and the amount of the silanol group in the structure derived from the surface treatment agent of the silica fine particle become appropriate, and the charge rising property is improved. In addition, due to the Sn satisfying the Expression (2), adsorption with the sulfonic acid moiety of dodecylbenzenesulfonic acid or dodecylsulfonate occurs moderately, which can suppress excessive electrostatic charging.

The Sn is preferably from 0.10 to 0.50, and is more preferably from 0.20 to 0.50.

For information, the Sn can be increased by performing the treatment under such conditions that the reaction of the surface treatment agent does not proceed so that the silanol group on the surface of the silica fine particle base remains, or by adding only a small amount of the treatment agent to such a degree that the surface of the silica fine particle base is not completely covered with the treatment agent. On the other hand, the Sn can be reduced by reducing the silanol group on the surface of the silica fine particle by subjecting the silica fine particle to the surface treatment. In addition, the Sn can be reduced also by extending a reaction time period or raising a temperature, at the time of the surface treatment.

In the present invention, furthermore, the surface treatment state of the silica fine particle A is controlled, which includes $(D_{DD}/S_{DD})/B$, $(D_{CP}/S_{CP})/B$ and $(D_{CP}/S_{CP})/(D_{DD}/S_{DD})$. The surface treatment state of the silica fine particle A is calculated by a solid-state $^{29}$Si-NMR DD/MAS method and a CP/MAS method. In the DD/MAS measurement method, all Si atoms in the measurement sample are observed, and accordingly, information on the content of Si atoms in the silica fine particle is obtained. On the other hand, in the CP/MAS measurement method, the measurement is performed so as to magnetize a Si atom via an H atom existing in the vicinity of the Si atom, and accordingly, the Si atom in the vicinity in which the H atom exists is observed with high sensitivity. The Si atom which has the H atom existing in the vicinity has low mobility. In other words, in the CP/MAS measurement method, the information is obtained which concerns the presence of the Si atom having the low mobility in the measurement sample.

In general, in the solid-state $^{29}$Si-NMR, four types of peaks of an M unit (Formula (3)), a D unit (Formula (4)), a T unit (Formula (5)) and a Q unit (Formula (6)) can be observed for the Si atom in a solid sample.

Formula (3)

M unit: $(R_i)(R_j)(R_k)SiO_{1/2}$

Formula (4)

D unit: $(R_g)(R_h)Si(O_{1/2})_2$

Formula (5)

T unit: $R_mSi(O_{1/2})_3$ and

Formula (6)

Q unit: $Si(O_{1/2})_4$, (wherein $R_i$, $R_j$, $R_k$, $R_g$, $R_h$ and $R_m$ in the Formulae (3), (4), (5) each represent: an alkyl group such as a hydrocarbon group having from 1 to 6 carbon atoms; a halogen atom; a hydroxy group; an acetoxy group; an alkoxy group; or the like, any of which bonds to silicon.)

In the present disclosure, the silica fine particle A is surface-treated with the surface treatment agent that imparts the dimethylsiloxane structure, and the portion derived from the surface treatment agent is included in the term "silica fine particle A". In addition, the silica fine particle A at the time before being surface-treated is also referred to as "silica fine particle base". The Q unit indicates a peak corresponding to the Si atom in the silica fine particle base at the time before being surface-treated. The BET specific surface area of the silica fine particle at the time after the surface treatment shall be represented by B ($m^2/g$). The M unit, the D unit and the T unit respectively show peaks corresponding to the structures of the surface treatment agents of the silica fine particles A represented by the above Formulae (3) to (5). Any of the units can be identified by the chemical shift value of a solid-state $^{29}$Si-NMR spectrum, and the Q unit appears at a chemical shift of −130 ppm to −85 ppm, the T unit appears at a chemical shift of −65 ppm to −51 ppm, the D unit appears at a chemical shift of −25 ppm to −15 ppm, and the M unit appears at a chemical shift of 10 ppm to 25 ppm; and each can be quantitatively determined by an integrated value.

In the chemical shift of the silica fine particle A obtained by the solid-state $^{29}$Si-NMR DD/MAS method, the peak area of the D unit having a peak top in the range of −25 ppm to −15 ppm shall be represented by $D_{DD}$, and the sum of the peak areas of the M unit, the D unit, the T unit and the Q unit in a range of −140 ppm to 100 ppm shall be represented by $S_{DD}$. In addition, the specific surface area of the silica fine particle shall be represented by B ($m^2/g$). At this time, a value $(D_{DD}/S_{DD})/B$ of a ratio of $(D_{DD}/S_{DD})$ to B is from $4.70\times10^{-6}$ to $1.40\times10^{-3}$.

$(D_{DD}/S_{DD})/B$ means an amount of Si atoms per unit surface area, which constitute the D unit, with respect to the amount of Si atoms in the whole silica fine particles. Here, the silica fine particle in which a fragment corresponding to a structure shown by the above Formula (1) is observed in the TOF-SIMS measurement, and which has a peak in the D unit in the solid-state $^{29}$Si-NMR measurement, means that the silica fine particle is surface-treated with a compound imparting a dimethylsiloxane structure.

In other words, $(D_{DD}/S_{DD})/B$ represents the amount of dimethylsiloxane on the surface of the silica fine particle per unit surface area. As $(D_{DD}/S_{DD})$ B is smaller, the amount of dimethylsiloxane on the surface of the silica fine particle is smaller, which does not obstruct the fluidity as an external additive, but it becomes difficult to control the amount of silanol on the surface of the silica fine particle base. On the other hand, as $(D_{DD}/S_{DD})/B$ is larger, the amount of dimethylsiloxane on the surface of the silica fine particle becomes larger, which obstructs the fluidity as the external additive.

Specifically, when $(D_{DD}/S_{DD})/B$ is smaller than $4.70\times10^{6}$, the amount of the surface treatment agent with respect to the silica fine particle is small, and it becomes difficult to control $(D_{CP}/S_{CP})/B$ which will be described later. In addition, when $(D_{DD}/S_{DD})/B$ exceeds $1.40\times10^{-3}$, the amount of dimethylsiloxane becomes excessive, and the fluidity of the toner decreases. It is preferable for $(D_{DD}/S_{DD})/B$ to be from $5.00\times10^{-6}$ to $1.40\times10^{-3}$, and is more preferable to be from $5.00\times10^{6}$ to $6.70\times10^{4}$.

A ratio of $(D_{DD}/S_{DD})/B$ can be controlled by adjustment of the amount of the surface treatment agent at the time of the surface treatment of the silica fine particle base.

On the other hand, in the chemical shift of the silica fine particle A obtained by the solid-state $^{29}$Si-NMR CP/MAS method, the peak area of the D unit having a peak top in the range of −25 ppm to −15 ppm shall be represented by $D_{CP}$, and the sum of the peak areas of the M unit, the D unit, the T unit and the Q unit in the range of −140 ppm to 100 ppm shall be represented by $S_{CP}$. In addition, the specific surface area of the silica fine particle shall be represented by B($m^2/g$). At this time, a value $(D_{CP}/S_{CP})/B$ of a ratio of $(D_{CP}/S_{CP})$ to B is from $4.70\times10^{-4}$ to $1.00\times10^{-2}$.

$(D_{CP}/S_{CP})/B$ means the amount of Si atoms having low mobility per unit surface area, which constitute the D unit, with respect to the amount of Si atoms having the low mobility in the silica fine particle. Here, the silica fine particle of which the fragment corresponding to the structure shown by the above Formula (1) is observed in the TOF-SIMS measurement, and which has a peak in the D unit in the solid-state $^{29}$Si-NMR CP/MAS measurement, shows that the compound having the dimethylsiloxane structure exists on the surface thereof in a state in which the mobility is low. This is considered to mean that the compound having the dimethylsiloxane structure is chemically or physically adheres to the surface of the silica fine particle base.

In other words, the $(D_{CP}/S_{CP})/B$ represents the amount of dimethylsiloxane which adheres to the surface of the silica fine particle per unit surface area. The present inventors consider that the dimethylsiloxane adhering to the surface of the silica fine particle is an important factor in the chargeability of the silica fine particle. The above described $(D_{DD}/S_{DD})/B$ contains an amount of dimethylsiloxane which has low adhesiveness to the surface of the silica fine particle, in addition to the dimethylsiloxane adhering to the surface of the silica fine particle. The dimethylsiloxane having a low adhesiveness to the surface of the silica fine particle has a large effect of blocking fluidity, in addition to a small contribution to the charging control. Because of this, it is considered important to control an absolute amount and an abundance ratio of dimethylsiloxane adhering to the surface of the silica fine particle, which has a relatively small effect of blocking the fluidity and largely contributes to the charging control.

When the $(D_{CP}/S_{CP})/B$ is smaller than $4.70\times10^{-4}$, the surface treatment of the silica fine particle is not sufficient, and a large amount of the silanol group remains on the surface of the silica fine particle base, and results in causing the excessive electrostatic charging.

When the $(D_{CP}/S_{CP})/B$ exceeds $1.00\times10^{-2}$, the amount of dimethylsiloxane adhering to the surface of the silica fine particle becomes excessive, the amount of the silanol group on the surface of the silica fine particle base becomes insufficient, and the chargeability decreases. It is preferable for the $(D_{CP}/S_{CP})/B$ to be from $4.70\times10^{-4}$ to $9.80\times10^{-3}$, and is more preferable to be from $1.10\times10^{-3}$ to $9.80\times10^{-3}$.

The $(D_{CP}/S_{CP})/B$ can be controlled by adjustment of the reaction time period and temperature at the time of the surface treatment of the silica fine particle base with a specific surface treatment agent. The $(D_{CP}/S_{CP})/B$ can be controlled by adjustment of the amount of the surface treatment agent, but it is difficult to achieve compatibility with a control range of $(D_{DD}/S_{DD})/B$ in the present invention.

From the above described findings, it becomes important to control a value of a ratio of $(D_{CP}/S_{CP})$ to $(D_{DD}/S_{DD})$. $(D_{CP}/S_{CP})/(D_{DD}/S_{DD})$ represents a ratio of dimethylsiloxane adhering to the surface of the silica fine particle in the dimethylsiloxane existing on the surface of the silica fine particle. Specifically, $(D_{CP}/S_{CP})/(D_{DD}/S_{DD})$ is from 3.00 to $3.00\times10^{2}$. Due to the $(D_{CP}/S_{CP})/(D_{DD}/S_{DD})$ being set to the above range, the amount of dimethylsiloxane contributing to the charging control can be made appropriate.

The effect of the present invention is exhibited for the first time when the silica fine particle A having a controlled surface state is externally added to the toner surface having the above described BO bond and the dodecylbenzenesulfonic acid or the dodecylbenzenesulfonate.

[Preferable Configuration]

A preferable configuration of the present invention will be described below.

In the toner of the present invention, it is preferable that the content (based on mass) of dodecylbenzenesulfonic acid or a dodecylbenzenesulfonate is from 10 to 1000 ppm with respect to the toner. When the content is 10 ppm or more, an adsorption action for the silanol group of the silica fine particle is sufficiently exhibited, and the excessive electrostatic charging can be suppressed, which is preferable. More preferably, the content is 20 ppm or more. On the other hand, a compound such as the dodecylbenzenesulfonic acid tends to give an influence on the chargeability, when contained in a large amount in the toner, but when the content is 1000 ppm or less, the desired chargeability is obtained, which is preferable. More preferably, the content is 800 ppm or less.

When the abundance of boron atoms (based on mass) in the toner of the present invention is from 0.1 to 100 ppm, the chargeability can be appropriately controlled, which is preferable. The quantitative determination of boron atoms in the toner will be described later, but an atomic weight of boron in the toner can be measured by ICP-MS measurement.

It is more preferably for the abundance to be from 0.1 to 25 ppm, is further preferable to be from 0.1 ppm to 10 ppm, and further more preferable to be from 0.1 to 2.0 ppm.

It is preferable for a number-average particle size of a primary particle of the silica fine particle A to be from 5 to 50 nm, and is more preferable to be from 5 to 15 nm. Due to the silica fine particle A that has a particle size in this range and is externally added to the toner particle, the charge rising property of the toner becomes satisfactory.

It is preferable for the content of the silica fine particle A to be from 0.2 to 3.0 parts by mass, is more preferable to be from 0.2 to 2.0 parts by mass, and is further preferable to be from 0.2 to 1.5 parts by mass, with respect to 100 parts by mass of the toner particle. Due to the content of the silica fine particle A being controlled to the above range, the charge rising property of the toner becomes satisfactory.

It is preferable for the BET specific surface area of the silica fine particle A to be from 15 to 300 $m^2/g$, is more preferable to be from 20 to 300 $m^2/g$, and is further preferable to be from 20 to 280 $m^2/g$.

In the toner of the present invention, a ratio between the amount of boron and the abundance of $(D_{CP}/S_{CP})/B$ is also an important factor. Specifically, it is preferable that a relationship among the abundance of boron atoms (based on mass) $I_B$ [ppm], the content $S_A$ [parts by mass] of the silica fine particle A in the toner and $(D_{CP}/S_{CP})/B$ satisfies the following Expression (7).

$$2.6\times10^{-5} \le \left[(D_{CP}/S_{CP})/B\right]\times S_A/I_B \le 3.6\times10^{-3} \qquad \text{Expression (7)}$$

When the relationship is in the above range, the excellent charge rising property is obtained and the density unevenness in the longitudinal direction can be solved, which is preferable. The lower limit is more preferably $1.3\times10^{-4}$ or more, and is further preferably $4.3\times10^{-4}$ or more. The upper limit is more preferably $2.4\times10^{-3}$ or smaller, and is further preferably $2.0\times10^{-3}$ or smaller.

It is also preferable to adjust a ratio between the content (based on mass) D [ppm] of dodecylbenzenesulfonic acid or a dodecylbenzenesulfonate and the abundance of $(D_{CP}/S_{CP})/B$ in the toner. Specifically, it is preferable that a relationship among the content (based on mass) D [ppm] of dodecylbenzenesulfonic acid or a dodecylbenzenesulfonate, the content $S_A$ [parts by mass] of the silica fine particle A in the toner and $(D_{CP}/S_{CP})/B$ satisfies the following Expression (8).

$$7.7\times10^{3} \le D/\left[(D_{CP}/S_{CP})/B\right]\times S_A \le 1.9\times10^{6} \qquad \text{Expression (8)}$$

When the relationship is in the above range, the excellent charge rising property is obtained and the density unevenness in the longitudinal direction can be solved, which is preferable. The above range is more preferably from $1.5\times10^{4}$ to $7.7\times10^{5}$.

It is preferable that the toner of the present invention contains a titanium compound particle B having a major axis of from 300 to 3000 nm, and an aspect ratio of from 5.0 to 50.0. The above titanium compound particle B is classified as an external additive having a large particle size and low resistance, and has a needle-like structure.

When the titanium compound particle B is used, the excessive electrostatic charging is suppressed in the low print intermittent mode under a low humidity environment, the deterioration of the toner at the time of long-term use is also suppressed, and the image density maintenance rate at the time of the long-term use is improved, which is preferable. The content of the above titanium compound particle B is preferably from 0.1 to 10 parts by mass, with respect to 100 parts by mass of the toner particle.

For information, the above titanium compound particle B is not particularly limited as long as the particle satisfies the above conditions. For example, titanium oxide easily satisfies the above conditions, and rutile-type titanium oxide is one of preferable forms.

It is preferable in the toner of the present invention to control a ratio between the amount of boron and the amount of the titanium compound particle B. Specifically, it is preferable that a relationship between the abundance of boron atoms (based on mass) $I_B$ [ppm] and a content T [parts by mass] of the titanium compound particle B satisfies the following Expression (9).

$$5.0\times10^{-2} \leq T/I_B \leq 8.3 \qquad \text{Expression (9)}$$

When the relationship is in the above range, the density unevenness in the longitudinal direction can be solved, and the image density maintenance rate at the time of long-term use can be maintained at a high level, which is preferable. The above range is more preferably from 0.5 to 5.0.

It is also preferable to add titanium oxide (titanium compound particle C) which does not correspond to the titanium compound particle B, to the titanium compound particle B, and to use both in combination, for optimization of the chargeability. It is preferable that a particle size of the titanium compound particle C is from 20 to 250 nm.

It is preferable that the toner of the present invention has a polyester resin in the surface layer of the toner particle. This is because the polyester resin tends to easily retain a water content in a low humidity environment, and tends to suppress the excessive electrostatic charging, in combination with the existence of the BO bond.

Furthermore, it is preferable that the surface layer of the above polyester resin has a thickness of from 300 to 700 nm. Due to the surface layer having the thickness, the above water content is sufficiently retained, and accordingly, there has been a tendency that the effect of suppressing excessive electrostatic charging is improved.

[Constituent Component of Toner and Method for Producing Toner]

Each component constituting the toner and a method for producing the toner will be described in more detail.

<Binder Resin>

The toner particle contains a binder resin. It is preferable that a content of the binder resin is 50% by mass or more of the total amount of the resin components in the toner particle.

The binder resins are not particularly limited, and examples thereof include a styrene acrylic resin, an epoxy resin, a polyester resin, a polyurethane resin, a polyamide resin, a cellulose resin, a polyether resin, and mixed resins and composite resins of these resins. The styrene acrylic resin and the polyester resin are preferable in points of being inexpensive, easily available, and excellent in low-temperature fixability. The polyester resin is more preferable.

The polyester resin is obtained by selection and combination of suitable ones from polyvalent carboxylic acid, polyol, hydroxycarboxylic acid and the like, and synthesis by a known method such as an ester exchange method or a polycondensation method. Preferably, the polyester resin includes a polycondensate of a dicarboxylic acid and a diol.

The polyvalent carboxylic acid is a compound containing two or more carboxy groups in one molecule. Among these compounds, dicarboxylic acid is a compound containing two carboxy groups in one molecule and is preferably used.

The examples include: oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

In addition, examples of the polyvalent carboxylic acid other than the above dicarboxylic acid include: trimellitic acid, trimesic acid, pyromellitic acid, naphthalene tricarboxylic acid, naphthalene tetracarboxylic acid, pyrene tricarboxylic acid, pyrene tetracarboxylic acid, itaconic acid, glutaconic acid, n-dodecyl succinic acid, n-dodecenyl succinic acid, isododecyl succinic acid, isododecenyl succinic acid, n-octyl succinic acid and n-octenyl succinic acid. These may be used singly, or in combinations of two or more thereof.

The polyol is a compound having two or more hydroxyl groups in one molecule. Among these polyols, a diol is a compound containing two hydroxyl groups in one molecule, and is preferably used.

Specific examples include: ethylene glycol, diethylene glycol, triethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosandecanediol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, polytetramethylene glycol, hydrogenated bisphenol A, bisphenol A, bisphenol F, bisphenol S, and alkylene oxide (ethylene oxide, propylene oxide, butylene oxide and the like) adducts of the above bisphenols.

Among the compounds, alkylene glycols having from 2 to 12 carbon atoms and alkylene oxide adducts of bisphenols are preferable; and alkylene oxide adducts of bisphenols, and combination use of the adducts with alkyleneglycols having from 2 to 12 carbon atoms are particularly preferable. The alkylene oxide adduct of bisphenol A includes a compound represented by the following Formula (A).

(A)

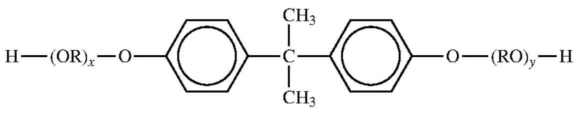

(wherein R is each independently an ethylene group or a propylene group, x and y are each an integer of 0 or more, and an average value of x+y is from 0 to 10.)

It is preferable that the alkylene oxide adduct of bisphenol A is a propylene oxide adduct and/or an ethylene oxide adduct of bisphenol A. More preferably, the alkylene oxide adduct is the propylene oxide adduct. In addition, it is preferable that an average value of x+y is from 1 to 5.

Examples of a trivalent or higher alcohol include: glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac, and alkylene oxide adducts of the above trivalent or higher polyphenols. These may be used singly, or in combinations of two or more thereof.

Examples of the styrene acrylic resin include: homopolymers formed from the following polymerizable monomers; copolymers obtained by combining two or more types of these polymerizable monomers; and further mixtures thereof.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; (meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth) acrylate, diethyl phosphate ethyl (meth) acrylate, dibutyl phosphate ethyl (meth) acrylate, 2-benzoyloxyethyl (meth)acrylate, (meth)acrylonitrile, 2-hydroxyethyl (meth)acrylate, (meth) acrylic acid, and maleic acid;

vinyl ether-based monomers such as vinyl methyl ether and vinyl isobutyl ether; vinyl ketone-based monomers such as vinyl methyl ketone, vinyl ethyl ketone, and vinyl isopropenyl ketone; and polyolefins such as ethylene, propylene and butadiene.

The styrene acrylic resin can contain a polyfunctional polymerizable monomer as needed. Examples of the polyfunctional polymerizable monomer include: diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, neopentyl glycol di(meth)acrylate, tripropylene glycol di(meth) acrylate, polypropylene glycol di(meth)acrylate, 2,2'-bis(4-((meth)acryloxydiethoxy)phenyl) propane, trimethylolpropane tri(meth)acrylate, tetramethylolmethane tetra(meth)acrylate, divinylbenzene, divinylnaphthalene and divinyl ether.

In addition, in order to control a degree of polymerization, a known chain transfer agent and a known polymerization inhibitor can also be further added. Examples of the polymerization initiator for obtaining the styrene acrylic resin include organic peroxide-based initiators and azo-based polymerization initiators.

Examples of the organic peroxide-based initiator include: benzoyl peroxide, lauroyl peroxide, di-α-cumyl peroxide, 2,5-dimethyl-2,5-bis(benzoylperoxy) hexane, bis(4-t-butylcyclohexyl) peroxydicarbonate, 1,1-bis(t-butylperoxy) cyclododecane, t-butyl peroxymaleic acid, bis(t-butylperoxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of the azo-based polymerization initiator include: 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobismethylbutyronitrile, and 2,2'-azobis-(methyl isobutyrate).

In addition, as the polymerization initiator, a redox-based initiator can also be used in which an oxidizing substance and a reducing substance are combined.

The oxidizing substance includes: hydrogen peroxide; an inorganic peroxide of a persulfate (a sodium salt, a potassium salt and an ammonium salt); and an oxidizing metal salt of a tetravalent cerium salt.

Examples of the reducing substance include; a reducing metal salt (a divalent iron salt, a monovalent copper salt and a trivalent chromium salt); ammonia; a lower amine (an amine having about from 1 to 6 carbon atoms, such as methylamine and ethylamine); an amino compound such as hydroxylamine; a reducing sulfur compound such as sodium thiosulfate, sodium hydrosulfite, sodium hydrogen sulfite, sodium sulfite and sodium formaldehyde sulfoxylate; a lower alcohol (having from 1 to 6 carbon atoms); ascorbic acid or a salt thereof, and a lower aldehyde (having from 1 to 6 carbon atoms).

The polymerization initiators are selected with reference to a 10-hour half-life temperature, and are used singly or in mixture.

The amount of the polymerization initiator to be added varies depending on a desired degree of polymerization, but is generally from 0.5 to 20.0 parts by mass with respect to 100.0 parts by mass of the polymerizable monomer.

The toner of the present invention has a configuration in which the binder resin is a styrene acrylic resin and the shell layer is a polyester resin, and accordingly is excellent in the charge rising property, which is preferable.

<Release Agent>

In the toner, a known wax can be used as a release agent.

Specific examples thereof include: petroleum-based waxes represented by paraffin wax, microcrystalline wax and petrolatum, and derivatives thereof, montan wax and derivatives thereof, hydrocarbon wax produced by a Fischer-Tropsch method and derivatives thereof; polyolefin waxes represented by polyethylene, and derivatives thereof, natural waxes represented by carnauba wax and candelilla wax, and derivatives thereof. The derivatives include oxides, block copolymers with a vinyl monomer, and graft modified products.

The specific examples also include: alcohols such as higher aliphatic alcohols; fatty acids such as stearic acid and palmitic acid, or acid amides, esters and ketones thereof, hydrogenated castor oil and derivatives thereof, vegetable waxes; and animal waxes. These can be used singly or in combinations.

Among these waxes and the like, in a case where polyolefin, hydrocarbon wax produced by a Fischer-Tropsch method or petroleum-based wax is used, the developability and transferability tend to be improved, which is preferable. Note that an antioxidant may be added to these waxes in such a range as not to give influence on the effect of the toner. In addition, suitable examples, from the viewpoint of phase separation properties with respect to the binder resin or a crystallization temperature, include higher fatty acid esters such as behenyl behenate and dibehenyl sebacate.

In addition, it is preferable that a content of the release agent is from 1.0 to 30.0 parts by mass, with respect to 100.0 parts by mass of the binder resin.

A melting point of the release agent is preferably 30° C. or higher to 120° C. or lower, and is more preferably 60° C. or higher to 100° C. or lower. Due to use of such a release agent as to exhibit the thermal characteristics as described above, the release effect is efficiently exhibited, and a wider fixing region is secured.

<Plasticizer>

The toner particle may contain a crystalline plasticizer in order to improve a sharp meltability. The plasticizer is not particularly limited, and the following known plasticizers can be used which are used for toners.

Specific examples include: esters of a monovalent alcohol and an aliphatic carboxylic acid, such as behenyl behenate, stearyl stearate and palmityl palmitate, or esters of a monovalent carboxylic acid and an aliphatic alcohol; esters of a divalent alcohol and an aliphatic carboxylic acid, such as ethylene glycol distearate, dibehenyl sebacate and hexanediol dibehenate, or esters of a divalent carboxylic acid and an aliphatic alcohol; esters of a trivalent alcohol and an aliphatic carboxylic acid, such as glycerol tribehenate, or esters of a trivalent carboxylic acid and an aliphatic alcohol; esters of a tetravalent alcohol and an aliphatic carboxylic acid, such as pentaerythritol tetrastearate and pentaerythritol tetrapalmitate, or esters of a tetravalent carboxylic acid and an aliphatic alcohol; esters of a hexavalent alcohol and an aliphatic carboxylic acid, such as dipentaerythritol hexastearate and dipentaerythritol hexapalmitate, or esters of a hexavalent carboxylic acid and an aliphatic alcohol; esters of a polyvalent alcohol and an aliphatic carboxylic acid, such as polyglycerol behenate, or esters of a polyvalent carboxylic acid and an aliphatic alcohol; and natural ester waxes such as carnauba wax and rice wax. These can be used singly or in combinations.

<Coloring Agent>

The toner particle may contain a coloring agent. As the coloring agent, a known pigment or dye can be used. As the coloring agent, a pigment is preferable from the viewpoint of being excellent in weather resistance.

Examples of a cyan coloring agent include: copper phthalocyanine compounds and derivatives thereof; anthraquinone compounds; and basic dye lake compounds. Specific examples thereof include the following coloring agents: C. I. Pigment Blue 1, 7, 15, 15:1, 15:2, 15:3, 15:4, 60, 62 and 66.

Examples of a magenta coloring agent include condensed azo compounds, diketopyrrolopyrrole compounds, anthraquinone compounds, quinacridone compounds, basic dye lake compounds, naphthol compounds, benzimidazolone compounds, thioindigo compounds and perylene compounds. Specific examples thereof include the following coloring agents: C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254; and C. I. Pigment Violet 19.

Examples of a yellow coloring agent include: condensed azo compounds, isoindolinone compounds, anthraquinone compounds, azo metal complexes, methine compounds and allylamide compounds. Specific examples thereof include the following coloring agents: C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191 and 194.

Examples of a black coloring agent include: a coloring agent which is toned to black with the above yellow coloring agent, the magenta coloring agent and the cyan coloring agent; carbon black; and magnetic substances.

These coloring agents can be used singly or as a mixture, and further can be used in a state of a solid solution. It is preferable to use the coloring agent in an amount of from 1.0 to 20.0 parts by mass, with respect to 100.0 parts by mass of the binder resin. For information, in a case where a production method that uses a magnetic substance in an aqueous medium is applied to the toner particle, which will be described later, the magnetic substance can also be subjected to hydrophobic treatment for the purpose of causing the resin to stably contain the magnetic substance therein. It is preferable to use the magnetic substance from the viewpoint of improving the durability of the toner particle.

<Charge Control Agent and Charge Control Resin>

The toner particle may contain a charge control agent or a charge control resin. As the charge control agent, known charge control agents can be used, and particularly, the charge control agent is preferable which has a high triboelectric charging speed and can stably maintain a constant triboelectric charge amount. Furthermore, when the toner particle is produced according to a suspension polymerization method, a charge control agent is particularly preferable which has low polymerization inhibiting property and does not substantially contain a substance soluble in the aqueous medium.

Examples of compounds that control the toner to negative chargeability include: monoazo metal compounds: acetylacetone metal compounds; metal compounds of aromatic oxycarboxylic acid, aromatic dicarboxylic acid, oxycarboxylic acid and dicarboxylic acid; aromatic oxycarboxylic acid, aromatic mono- and polycarboxylic acids, and metal salts, anhydrides and esters thereof, phenol derivatives such as bisphenol; urea derivatives; metal-containing salicylic acid-based compounds; metal-containing naphthoic acid-based compounds; boron compounds; quaternary ammonium salts; calixarenes; and charge control resins.

Examples of the charge control resin include polymers or copolymers having a sulfonic acid group, a sulfonate group or a sulfonic acid ester group. It is particularly preferable for the polymer having a sulfonic acid group, a sulfonate group or a sulfonic acid ester group to contain a sulfonic acid group-containing acrylamide-based monomer or a sulfonic acid group-containing methacrylamide-based monomer in an amount of 2% by mass or more by a copolymerization ratio, and is more preferable to contain any of the monomers in an amount of 5% by mass or more.

It is preferable for the charge control resin that a glass transition temperature (Tg) is 35° C. or higher to 90° C. or lower, a peak molecular weight (Mp) is from 10000 to 30000, and a weight-average molecular weight (Mw) is from 25000 to 50000. When this charge control resin is used, the charge control resin can impart favorable triboelectric charging characteristics to the toner particle without affecting the required thermal characteristics. Furthermore, when the charge control resin contains the sulfonic acid group, for example, the dispersibility of the charge control resin itself in the polymerizable monomer composition and the dispersibility of the coloring agent and the like are improved, and the coloring power, transparency and triboelectric charging characteristics can be further improved.

These charge control agents or charge control resins may be added singly or in combinations of two or more thereof. The amount of the charge control agent or the charge control resin to be added is preferably from 0.01 to 20.0 parts by mass, and is more preferably from 0.5 to 10.0 parts by mass, with respect to 100.0 parts by mass of the binder resin.

<Method for Producing Toner>

A method for producing the toner is not particularly limited, and known methods can be used such as a pulverization method, a suspension polymerization method, a dissolution suspension method, an emulsion aggregation method and a dispersion polymerization method. Any production method can be applied in order to obtain the toner of the present invention.

In order to obtain a structure having a BO bond on the toner surface, such a method is considered as to use a compound having the BO bond, and orient the compound onto the surface in an aqueous medium, or attach the compound to the toner particle in an external addition step, which will be described later. As the compound having the BO bond, an arbitrary compound can be used, but a boric acid compound is preferable because of easy handling. Examples of the boric acid compound include sodium tetraborate, borax and ammonium borate.

In addition, in order to arrange dodecylbenzenesulfonic acid or a dodecylbenzenesulfonate on the surface of the toner, the compound may be added. When quantitatively controlling the content of the dodecylbenzenesulfonic acid structure, such a method is considered as to add the dodecylbenzenesulfonic acid structure in an external addition step or the like, which will be described later, after the toner particle has been produced. For information, sodium dodecylbenzenesulfonate can be preferably used as the dodecylbenzenesulfonate.

<External Addition Step>

In the external addition step, a silica fine particle treated with a treatment agent for imparting a dimethylsiloxane structure to the toner particle and another external additive are externally added.

Examples of the treatment agent for imparting the dimethylsiloxane structure to the surface of the silica fine particle include: chlorosilanes such as methyltrichlorosilane, dimethyldichlorosilane, trimethylchlorosilane, phenyltrichlorosilane, diphenyldichlorosilane, t-butyldimethylchlorosilane and vinyltrichlorosilane; and siloxanes such as hexamethylcyclotrisiloxane, octamethylcyclotetrasiloxane, decamethylcyclopentasiloxane, hexamethyldisiloxane and octamethyltrisiloxane.

Among these treatment agents, dimethyldichlorosilane and octamethylcyclotetrasiloxane tend to easily achieve a surface state of the silica fine particle of the present invention, and accordingly are preferably used. In particular, dimethyldichlorosilane is preferable because it is easy to control the amount of silanol groups on the surface of the silica fine particle base.

Specific examples of the other external additives include; inorganic fine particle other than silica; and resin fine particle of a vinyl resin, a polyester resin, a silicone resin and the like. It is preferable to add these external additives, for example, while applying a shearing force in a dry state.

In addition, as described above, it is preferable that the toner contains the titanium compound particle B having a major axis of from 300 to 3000 nm and an aspect ratio of from 5.0 to 50.0. Furthermore, it is also preferable to add titanium oxide (titanium compound particle C) which does not correspond to the titanium compound particle B, to the titanium compound particle B, and to use both in combination.

[Method for Measuring Each Physical Property]

Next, methods for measuring each physical property according to the present invention will be described.

<Method for Measuring Fragment Peaks Derived from Boron Atom and BO Structure>

The fragment peaks derived from the boron atom and the BO structure in the toner were detected with the use of TOF-SIMS.

TRIFT-IV manufactured by ULVAC-PHI, Inc. is used for the measurement of the fragment ions on the toner surface, in which TOF-SIMS is used. Analysis conditions are as follows.

Sample preparation: to attach toner particle to an indium sheet.

Primary ion: Au ion

Acceleration voltage: 30 kV

Charge neutralization mode: On

Measurement mode: Positive

Raster: 200 μm

Measurement time period: 60 s

It is confirmed whether a fragment ion derived from a boron atom is observed, from an obtained mass profile of secondary ion mass/secondary ion charge number (m/z). For information, in the present invention, the presence or absence of the BO bond has been determined according to the presence or absence of the mass profile of the $BO_2$, in consideration of a balance with peak intensity.

<Determination of Presence or Absence of Dodecylbenzenesulfonic Acid or Dodecylbenzenesulfonate in Toner>

The presence or absence of dodecylbenzenesulfonic acid or dodecylbenzenesulfonate is determined by an analysis by an MS/MS (mass mass) method that uses a tandem mass spectrometer which is directly connected to a liquid chromatograph ESI/MS analysis equipment.

The MS/MS method is a mass spectrometry method that measures a fragment which has been taken out in a first analysis system, by a second analysis system, thereby can detect a fragment having a further small molecular weight, and can easily analyze the structure of a sample.

Elution condition A: to use methanol (JISK8891 standard equivalent) in an amount of 10 times of the toner based on mass, and stir the resultant liquid under 25° C. by a stirring apparatus at the number of rotations of a rotor of 200 rpm for 10 hours.

Centrifugal separation condition A: to subject the resultant liquid to rotation under 25° C. for 30 minutes, with a radius of rotation of 10.1 cm, and the number of rotations of 3500 rpm.

The sample is prepared by operations of using the toner, preparing a sample under the above elution condition A, and separating the sample into a solid content and a supernatant liquid under the above centrifugal separation condition A.

The supernatant obtained by the above preparation is supplied to the following measuring apparatus, and is subjected to a liquid chromatography ESI/MS analysis under the following analysis conditions B. A mass spectrum of the anion is obtained, and it is confirmed that a peak is detected at a place of m/z=325. In addition, an ion that has been detected as a peak at the place of m/z=325 is supplied as a precursor ion to the tandem mass spectrometer, and an MS/MS spectrum is obtained under the analysis condition B.

Measuring apparatus: Ultimate3000 (manufactured by Thermo Fisher Scientific Inc.)

Mass spectrometer: LCQ Fleet (manufactured by Thermo Fisher Scientific Inc.)

Analysis condition B: to detect ions which have been ionized under the conditions of capillary voltage: −35 V and tube lens voltage: −110 V, as anions, to select the ion detected at m/z=325 as a precursor ion, and to detect an ion which has been dissociated by collision-induced dissociation against an inert gas: He with a collision energy: 35 eV.

Ionization technique: electrospray method (ESI)
Sheath Gas: 10(arb. unit.)
Aux Gas: 5(arb. unit.)
Spray voltage: 5 kV
Capillary temperature: 275° C.
Moving phase: methanol (product corresponding with JISK8891 standard)
Column: unused (Stationary phase is not used.)
Flow rate: 1 ml/min
Injection volume: 10 μl
Chromatogram detector: UV detector
MS acquisition time period: 5 min
MS measurement range: 50 to 1500 m/z
Collision inert gas: He (helium)
Collision energy: 35 eV <Quantitative Determination of Dodecylbenzenesulfonic Acid or Dodecylbenzenesulfonate in Toner>

The dodecylbenzenesulfonic acid or dodecylbenzenesulfonate in the toner is quantitatively determined by subjecting the methanol extract in the toner to LC/MS measurement under the following conditions. A calibration curve is prepared by using sodium dodecylbenzenesulfonate as a standard, and then the quantity is determined.

(LC/MS analysis conditions)
Model: Agilent 6130 Quadropole LC/MS (manufactured by Agilent Technologies Japan Ltd.
Eluent; methanol
Column: ZORBAX Eclipse Plus C18 (1.8 μm, 100×4.6 mm I. D) (manufactured by Agilent Technologies Japan Ltd.
Flow rate: 1.0 mL/min
Column temperature: 30° C.

<Measurement of Abundance of Boron Atom in Toner>

The content of boron atoms on the surface of the toner particle is measured with an inductively coupled plasma mass spectrometer (ICP-MS (manufactured by Agilent Technologies Japan Ltd.)).

For pre-treatment, an aqueous solution of 6.0 mol/L of nitric acid is prepared with the use of 60% nitric acid (Kanto Chemical Co., Inc., Specification Ultrapur) and ultrapure water. A sample of a toner-containing solution is prepared by adding 5.00 g of 6.0 mol/L nitric acid to 50.0 mg of the toner, and stirring the resultant liquid. A toner cake is prepared by leaving the sample to stand for 120 minutes, and then filtering the sample through a filter paper having a pore size of 1 μm; and then, the toner is separated from the sample of the toner-containing solution by addition of 10.00 g of ultrapure water to the toner cake as a washing liquid. A solution sample for boron atom measurement is prepared by addition of ultrapure water to the solution sample of the filtrate so that the total amount becomes 50.00 g.

A content of boron atoms on the toner surface was measured by operations of: preparing a blank solution sample by adding ultrapure water to 5.00 g of an aqueous solution of 6.0 mol/L nitric acid so that the total amount becomes 50.00 g, and a solution sample of which the content of boron atom is known; creating a calibration curve; and quantitatively determining the boron atom contained in the sample for boron atom measurement.

<Solid-State $^{29}$Si-NMR DD/MAS Measurement of Silica Fine Particle and Calculation Method of $(D_{DD}/S_{DD})/B$, $(D_{CP}/S_{CP})/B$ and $(D_{CP}/S_{CP})/(D_{DD}/S_{DD})$ by CP/MAS Measurement>

The solid-state $^{29}$Si-NMR measurement of the silica fine particle is performed after the silica fine particle has been separated from the toner surface. In the following, a method for separating the silica fine particle from the toner surface and the solid-state $^{29}$Si-NMR measurement will be described.

(Method for Separating Silica Fine Particle from Toner Surface)

When the silica fine particle separated from the surface of the toner is used as a measurement sample, the silica fine particle is separated from the toner according to the following procedure.

Sucrose (produced by Kishida Chemical Co., Ltd.) in an amount of 1.6 kg is added to 1 L of ion-exchanged water, and is dissolved while being heated in a hot water bath; and a concentrated liquid of sucrose is prepared. A dispersion is prepared by charging 31 g of the concentrated liquid of sucrose, 6 mL of Contaminon N (aqueous solution of 10% by mass of neutral detergent having pH 7 for cleaning precision measuring instruments, which is formed of a nonionic surface active agent, an anionic surface active agent and an organic builder, produced by Fujifilm Wako Pure Chemical Corporation), into a centrifuge tube. The toner in an amount of 10 g is added to the dispersion, and a lump of the toner is disaggregated with a spatula or the like.

The centrifuge tube is set in "KM Shaker" (model: V. SX) manufactured by Iwaki Industry Co., Ltd., and is shaken for 20 minutes under the condition of 350 reciprocations per minute. After shaking, the solution is transferred to a glass tube (50 mL) for a swing rotor, and is centrifuged in a centrifuge under the conditions of 3500 rpm and for 30 minutes.

In the glass tube after the centrifugal separation, the toner particle exists in the uppermost layer, and an inorganic fine particle mixture containing the silica fine particle exists in an aqueous solution side of a lower layer. An aqueous solution in an upper layer and the aqueous solution in the lower layer are separated, and are each dried; and the toner particle is obtained from the upper layer side, and the inorganic fine particle mixture is obtained from the lower layer side. The obtained toner particle is used for the measurement of the abundance of the structure of Expression (9) which will be described later. The above centrifugal separation step is repeated so that the amount of the inorganic fine particle mixture obtained from the lower layer side becomes 10 g or more in total.

Subsequently, 10 g of the obtained inorganic fine particle mixture is added to a dispersion containing 100 mL of ion-exchanged water and 6 mL of Contaminon N, and is dispersed therein. The obtained dispersion is transferred to a glass tube (50 mL) for a swing rotor, and is centrifuged in a centrifuge under the conditions of 3500 rpm and for 30 minutes.

In the glass tube after the centrifugal separation, the silica fine particle exists in the uppermost layer, and other inorganic fine particles exist in an aqueous solution side of the lower layer. The aqueous solution of the upper layer is collected, and if necessary, a centrifugal separation operation is repeated; and after sufficient separation, the dispersion is dried, and the silica fine particle is collected.

Next, the silica fine particle recovered from the toner particle is subjected to solid-state $^{29}$Si-NMR measurement under such measurement conditions as are shown in the following.

(DD/MAS Measurement Conditions for Solid-State $^{29}$Si-NMR Measurement)

The DD/MAS measurement conditions for the solid-state $^{29}$Si-NMR measurement are as follows.

Apparatus: JNM ECX5002 (JEOL RESONANCE)
Temperature: room temperature
Measurement method: DD/MAS method $^{29}$Si 450
Sample tube: zirconia 3.2 mmφ
Sample: to be filled in a test tube in a powder form
Number of rotations of sample: 10 kHz
Delay time: 180 s
Number of integrations: 2000
Standard substance for calibration: DSS (sodium 3-(trimethylsilyl)-1-propanesulfonate)

After the above measurement, a plurality of silane components having different substituents and bonding groups are separated into peaks of the following M unit, D unit, T unit and Q unit, from a solid-state $^{29}$Si-NMR spectrum of the silica fine particle, by curve-fitting.

The curve-fitting is performed by use of EXcalibur for Windows (registered trademark) version 4.2 (EX series), which is a software for JNM-EX400 manufactured by JEOL Ltd. The measured data is read by clicking "lD Pro" from the menu icon. Next, "Curve fitting function" is selected from "Command" of the menu bar, and the curve-fitting is performed. Curve-fitting is performed for each component so that a difference (composite peak difference) is minimized between a composite peak obtained by combining each peak obtained by curve-fitting and a peak of a measurement result.

Formula (3)

M unit: $(R_i)(R_j)(R_k)SiO_{1/2}$

Formula (4)

D unit: $(R_g)(R_h)Si(O_{1/2})_2$

Formula (5)

T unit: $R_mSi(O_{1/2})_3$ and

Formula (6)

Q unit: $Si(O_{1/2})_4$, (wherein $R_i$, $R_j$, $R_k$, $R_g$, $R_h$ and $R_m$ in formulae (3), (4), (5) each represent: an alkyl group such as a hydrocarbon group having from 1 to 6 carbon atoms; a halogen atom; a hydroxy group; an acetoxy group; an alkoxy group; or the like, any of which bonds to silicon.)

After the peak separation, a ratio $(D_{DD}/S_{DD})/B$ is calculated by operations of: calculating an integrated value $D_{DD}$ of the D unit of which the chemical shift exists in a range of −25 ppm to −15 ppm, and a sum $S_{DD}$ of all integrated values of the M, D, T and Q units of which the chemical shifts exist in a range of −140 ppm to 100 ppm; and determining a BET specific surface area B ($m^2/g$) of the silica fine particle by a method which will be described later.

(CP/MAS Measurement Conditions for Solid-State $^{29}$Si-NMR Measurement)

The CP/MAS measurement conditions for the solid-state $^{29}$Si-NMR measurement are as follows.

Apparatus: JNM ECX5002 (JEOL RESONANCE)
Temperature: room temperature
Measurement method: CP/MAS method $^{29}$Si 450
Sample tube: zirconia 3.2 mmtb
Sample: to be filled in a test tube in a powder form
Number of rotations of sample: 10 kHz
Delay time: 5 s
Number of integrations: 12000
Contact time: 10 ms
Standard substance for calibration: DSS (sodium 3-(trimethylsilyl)-1-propanesulfonate)

After the above measurement, a plurality of silane components having different substituents and bonding groups are separated into peaks of the above M unit, D unit, T unit and Q unit, from a solid-state $^{29}$Si-NMR spectrum of the silica fine particle, by the same curve-fitting as described above.

After the peak separation, a ratio $(D_{CP}/S_{CP})/B$ is calculated by operations of calculating an integrated value $D_{CP}$ of the D unit of which the chemical shift exists in a range of −25 ppm to −15 ppm, and a sum $S_{CP}$ of all integrated values of the M, D, T and Q units of which the chemical shifts exist in a range of −140 ppm to 100 ppm; and determining a BET specific surface area B ($m^2/g$) of the silica fine particle by a method which will be described later.

<Method for Measuring Fragment Ion on Surface of the Silica Fine Particle with Time-of-Flight Secondary Ion Mass Spectrometry (TOF-SIMS)>

The TOF-SIMS measurement of the silica fine particle is performed with the use of the silica fine particle which has been separated from the toner by the above described method for separating the silica fine particle from the toner surface.

For the measurement of the fragment ions on the surface of the silica fine particle, which uses TOF-SIMS, TRIFT-IV manufactured by ULVAC-PHI, Inc. is used.

Analysis conditions are as follows.
Sample preparation: to attach silica fine particle to an indium sheet
Primary ion: Au ion
Acceleration voltage: 30 kV
Charge neutralization mode: On
Measurement mode: Positive
Raster: 200 μm
Measurement time period: 60 s It is confirmed whether a fragment ion corresponding to the structure shown by the Formula (1) is observed, from an obtained mass profile of secondary ion mass/secondary ion charge number (m/z). For example, when the surface treatment agent is polydimethylsiloxane or cyclic siloxane, fragment ions are observed at positions of m/z=147, 207 and 221.

<Method for Measuring BET Specific Surface Area of Silica Fine Particle>

The BET specific surface area of the silica fine particle is measured according to the following procedure. As a measuring apparatus, "Automatic specific surface area-pore distribution measuring apparatus TriStar3000 (manufactured by Shimadzu Corporation)" is used which employs a gas adsorption method by a constant volume method as a measurement method. The measurement conditions are set and the measured data are analyzed with the use of the dedicated software "TriStar3000 Version 4.00" which is attached to the apparatus. In addition, a vacuum pump, a nitrogen gas pipe and a helium gas pipe are connected to the apparatus. Nitrogen gas is used as an adsorption gas, and a value which has been calculated by a BET multipoint method is defined as the BET specific surface area.

For information, the BET specific surface area is calculated in the following way. Firstly, nitrogen gas is caused to adsorb to silica fine particle, and an equilibrium pressure P ($P_a$) in the sample cell and an amount $V_a$ ($mol \cdot g^{-1}$) of nitrogen adsorbed to a magnetic substance at this time are measured. Then, an adsorption isotherm is obtained in which the horizontal axis represents a relative pressure $P_r$ which is a value obtained by dividing the equilibrium pressure P ($P_a$) in the sample cell by the saturated vapor pressure $P_o$ ($P_a$) of nitrogen, and the vertical axis represents the amount of adsorbed nitrogen $V_a$($mol \cdot g^{-1}$). Next, a monomolecular layer adsorption amount $V_m$ (mol·g$^{-1}$) which is an adsorption amount necessary for forming a monomolecular layer on the surface of the silica fine particle is determined by applying the following BET equation.

$$P_r/V_a(1-P_r)=1/(V_m\times C)+(C-1)\times P_r/(V_m\times C)$$

(Here, C is a BET parameter, and is a variable that varies depending on a type of measurement sample, a type of adsorption gas, and an adsorption temperature.)

The BET equation can be interpreted as such a straight line that when $P_r$ is the X-axis and $P_r/V_a(1-P_r)$ is the Y-axis, a slope is $(C-1)/(V_m\times C)$ and an intercept is $1/(V_m\times C)$. (This straight line is referred to as the BET plot.)

$$\text{Slope of straight line}=(C-1)/(V_m\times C)$$

$$\text{Intercept of straight line}=1/(V_m\times C)$$

When the measured value of $P_r$ and the measured value of $P_r/V_a(1-P_r)$ are plotted on a graph, and a straight line is drawn by the least-squares method, the values of the slope and the intercept of the straight line can be calculated. $V_m$ and C can be calculated by using these values and solving the simultaneous equations of the above slope and the intercept. Furthermore, the BET specific surface area S ($m^2$/g) of the silica fine particle is calculated from the $V_m$ calculated in the above and the molecular occupied cross-sectional area (0.162 $nm^2$) of nitrogen molecule, based on the following Expression.

$$S=V_m\times N\times 0.162\times 10^{-18}$$

(Here, N is Avogadro's number (mol$^{-1}$).)

The measurement using this apparatus is performed specifically according to the following procedure.

A tare of a dedicated glass sample cell (stem diameter of ⅜ inch, and volume of 5 mL) is precisely weighed which has been thoroughly washed and dried. Then, 0.1 g of the silica fine particle is charged into the sample cell with the use of a funnel. The sample cell containing the silica fine particle is set in a "pretreatment apparatus Bacuprep 061 (manufactured by Shimadzu Corporation)" to which a vacuum pump and a nitrogen gas pipe are connected, and vacuum deaeration is continued at 23° C. for 10 hours.

For information, in the vacuum deaeration, while the valve is adjusted so that the silica fine particle is not sucked by the vacuum pump, the sample cell is gradually deaerated. A pressure inside the cell gradually decreases along with the deaeration, and finally reaches 0.4 $P_a$ (about 3 mTorr).

After the vacuum deaeration has been completed, nitrogen gas is gradually injected to return the inside of the sample cell to an atmospheric pressure, and the sample cell is removed from the pretreatment apparatus. Then, the mass of the sample cell is precisely weighed, and an exact mass of the silica fine particle is calculated from the difference from the tare. For information, at this time, the sample cell is covered with a rubber stopper during weighing so that the silica fine particle in the sample cell is not contaminated by water content in the air or the like.

Next, a dedicated isothermal jacket is attached to the sample cell containing the silica fine particle. Then, a dedicated filler rod is inserted into the sample cell, and the sample cell is set in an analysis port of the apparatus. For information, the isothermal jacket is a cylindrical member formed of a porous material in an inner surface, which can suck up liquid nitrogen to a certain level by capillary action, and an impermeable material in an outer surface.

Subsequently, a free space of the sample cell is measured which includes a connected instrument. The free space is calculated by operations of measuring a volume of the sample cell at 23° C. with the use of helium gas, subsequently, cooling the sample cell with liquid nitrogen, then measuring the volume of the cooled sample cell with the use of helium gas in the same way, and converting from the difference between these volumes. In addition, the saturated vapor pressure $P_o(P_a)$ of nitrogen is automatically measured separately with the use of a $P_o$ tube which is built in the apparatus.

Next, the inside of the sample cell is vacuum-deaerated, and then the sample cell is cooled with liquid nitrogen while the vacuum deaeration is continued. After that, nitrogen gas is introduced into the sample cell step-by-step, and nitrogen molecules are caused to adsorb to the silica fine particle. At this time, an adsorption isotherm is obtained by measuring the equilibrium pressure P ($P_a$) as needed, and accordingly this adsorption isotherm is converted into a BET plot.

For information, points of the relative pressure $P_r$, from which data is collected, are set to 6 points in total of 0.05, 0.10, 0.15, 0.20, 0.25 and 0.30. From the obtained measured data, a straight line is drawn by the least-squares method, and $V_m$ is calculated from the slope and intercept of the straight line. Furthermore, the BET specific surface area of the silica fine particle is calculated with the use of the value of $V_m$ as described previously.

<Method for Measuring Amount of Si—OH in Silica Fine Particle>

The amount of Si—OH of the silica fine particle can be determined with the use of the silica fine particle which has been separated from the toner by the above described method for separating silica fine particle from the toner surface, according to the following method.

A sample liquid 1 is prepared by mixture of 25.0 g of ethanol and 75.0 g of an aqueous solution of 20% by mass of sodium chloride. In addition, 2.00 g of the silica fine particle is precisely weighed in a glass bottle, and a sample liquid 2 is prepared by addition of a mixed solvent of 25.0 g of ethanol and 75.0 g of an aqueous solution of 20% by mass of sodium chloride. The sample liquid 2 is stirred for 5 minutes or longer with a magnetic stirrer, and thereby the silica fine particle is dispersed.

Next, for each of the sample liquids 1 and 2, while an aqueous solution of 0.1 mol/L sodium hydroxide is added dropwise at 0.01 mL/min, a pH level of the sample liquid is measured. A titration amount (L) of the aqueous solution of sodium hydroxide is recorded at the time when the pH has reached 9.0. Sn (number/$nm^2$) of an amount of Si—OH per 1 $nm^2$ can be calculated from the following Expression.

$$Sn=[(a-b)\times c\times NA]/(d\times e)$$

a: titration amount (L) of NaOH to sample liquid 2 b: titration amount (L) of NaOH to sample liquid 1 c: concentration (mol/L) of NaOH solution used for titration

NA: Avogadro's number d: mass of silica fine particle (g)

e: BET specific surface area of silica fine particle ($nm^2/g$: converted from the specific surface ($m^2/g$) obtained above)

<Method for Measuring Number-Average Particle Size of Primary Particle of Silica Fine Particle A>

The number-average particle size of the silica fine particle is measured from a secondary-electron image which is obtained by observation of the toner surface with a scanning electron microscopy (SEM).

(Method for Acquiring Secondary-Electron Image of Toner)

Apparatus used: ULTRA PLUS manufactured by Carl Zeiss Microscopy Co., Ltd.

Acceleration voltage: 1.0 kV

WD: 2.5 mm

Aperture Size: 30.0 μm

Detection signal: SE2 (secondary electron)

Observation magnification: 50,000 times

Resolution: 1024×768 pixels

Pretreatment: to sprinkle toner on carbon tape (without vapor deposition of Pt)

The longest diameter of 100 pieces of primary particles of the silica fine particles on the surface of the toner particle is measured from the obtained secondary-electron image, and an arithmetic mean value is defined as the number-average particle size of the silica fine particle.

The silica fine particle and the titanium compound particle are distinguished from each other by element mapping with the use of SEM-EDX.

<Identification of Titanium Compound Particle B in Toner>

A major axis (maximum diameter) and an aspect ratio of the titanium compound particle B are measured with the use of a scanning electron microscope (for example, scanning electron microscope "S-4800" (trade name; manufactured by Hitachi, Ltd.)). In a visual field magnified up to 50,000 times, only external additives having a major axis of from 300 to 3000 nm or smaller were selected and observed; and the major axes and minor axes of 100 pieces of primary particles of the external additives were measured at random, and the aspect ratios were calculated. The particle having an aspect ratio of from 5.00 to 50.0 was defined as the titanium compound particle B (external additive B). For information, the aspect ratio was calculated by division of the major axis by the minor axis.

<Identification of Titanium Compound Particle C in Toner>

The major axis (maximum diameter) of the titanium compound particle C is measured with the use of a scanning electron microscope (for example, scanning electron microscope "S-4800" (trade name; manufactured by Hitachi, Ltd.)). In a visual field magnified up to 50,000 times, only external additives having a major axis of from 20 to 250 nm were selected and observed, and the major axes of 100 pieces of primary particles of the external additives were measured at random.

Furthermore, it can be determined whether the external additive is titanium oxide, by combination with elemental analysis by an energy dispersive X-ray spectrometry (EDS).

The toner is observed in a field of view magnified up to 50,000 times with the use of the scanning electron microscope "S-4800" (trade name; manufactured by Hitachi, Ltd.). The surface of the toner particle is focused, and the external additive to be discriminated is observed. The external additive to be discriminated is subjected to EDS analysis, and it can be known whether the external additive is titanium oxide, from the element peak.

<Measurement of Weight-Average Particle Size (D4) of Toner or Toner Particle>

The weight-average particle size (D4) of the toner or the toner particle is calculated by operations of: using a precision particle size distribution measuring apparatus "Coulter Counter Multisizer 3" (registered trade mark, manufactured by Beckman Coulter, Inc.) which is equipped with an aperture tube of 100 μm and based on a pore electric resistance method, and an attached dedicated software "Beckman Coulter Multisizer 3 Version 3.51" (manufactured by Beckman Coulter, Inc.) for setting the measurement conditions and analyzing the measured data; measuring a particle size distribution through effective measurement channels of 25000 channels; and analyzing the measured data.

As an aqueous electrolyte solution to be used for the measurement, for example, "ISOTON II" (produced by Beckman Coulter, Inc.) can be used in which special-grade sodium chloride is dissolved in ion-exchanged water so that the concentration becomes about 1% by mass.

Note that before the measurement and analysis, the dedicated software is set in the following way.

In the "change standard measurement method (SOM)" screen of the dedicated software, the total count number of a control mode is set to 50,000 particles, the number of times of measurement is set to 1 and a value obtained by using standard particles each having a particle diameter of 10.0 μm (manufactured by Beckman Coulter, Inc.) is set as a Kd value. A threshold and a noise level are automatically set by pressing a threshold/noise level measurement button. In addition, a current is set to 1,600 μA, a gain is set to 2, an electrolyte solution is set to ISOTON II (product name) and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256 and a particle diameter range is set to the range of from 2 to 60 m.

A specific measurement method is as described below.

(1) 200 mL of the electrolyte aqueous solution is charged into a 250 mL round-bottom beaker made of glass dedicated for the Multisizer 3. The beaker is set in a sample stand and the electrolyte aqueous solution in the beaker is stirred with a stirrer rod at 24 rotations/see in a counterclockwise direction. Then, dirt and bubbles in the aperture tube are removed by the "aperture tube flush" function of the dedicated software.

(2) 30 mL of the electrolyte aqueous solution is charged into a 100 mL flat-bottom beaker made of glass. 0.3 mL of a diluted solution prepared by diluting Contaminon N (a 10% by mass aqueous solution of a pH7 precision measuring device cleaning neutral detergent comprising a non-ionic surfactant, an anionic surfactant and an organic builder, manufactured by Wako Pure Chemical Industries, Ltd.) with ion-exchanged water by three mass fold is added to the electrolyte aqueous solution.

(3) A predetermined amount of ion-exchanged water and 2 mL of Contaminon N (product name) are added into the water tank of an ultrasonic dispersing unit (product name: Ultrasonic Dispersion System Tetra 150, manufactured by Nikkaki Bios Co., Ltd.) having an electrical output of 120 W in which two oscillators each having an oscillatory frequency of 50 kHz are built so as to be under the state of being out of phase by 180°.

(4) The beaker in the section (2) is set in the beaker fixing hole of the ultrasonic dispersing unit and the ultrasonic dispersing unit is operated. Then, the height position of the beaker is adjusted in order that the liquid surface of the electrolyte aqueous solution in the beaker may resonate with an ultrasonic wave from the ultrasonic dispersing unit to the fullest extent possible.

(5) 10 mg of the toner or toner particles is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted to from 10 to 40° C. in the ultrasonic dispersion.

(6) The electrolyte aqueous solution in the section (5) in which the toner or toner particles has been dispersed is added dropwise with a pipette to the round-bottom beaker in the section (1) placed in the sample stand and the concentration of the particles to be measured is adjusted to 5%. Then, measurement is performed until the particle diameters of 50,000 particles are measured.

(7) The measurement data is analyzed with the dedicated software included with the apparatus and the weight-average particle diameter (D4) is calculated. An “average diameter” on the “analysis/volume statistics (arithmetic average)” screen of the dedicated software when the dedicated software is set to show a graph in a vol % unit is the weight-average particle diameter (D4).

EXAMPLES

The present invention will be described in more detail below with reference to Examples and Comparative Examples, but the present invention is not limited thereto at all. Parts which are used in formulations of Examples are based on mass unless otherwise specified.

<Production of Magnetic Substance 1>

Magnetic iron oxide in an amount of 100 parts was charged into a high-speed mixer (LFS-2 type, manufactured by Fukae Powtec Co., Ltd.), and 8.0 parts of an aqueous solution containing a silane compound was added dropwise for 2 minutes while the mixture was stirred at the number of rotations of 2000 rpm. After that, the mixture was mixed and stirred for 5 minutes.

Next, in order to enhance adhesiveness of the silane compound, the mixture was dried at 40° C. for 1 hour to decrease the water content, and then, the resultant mixture was dried at 110° C. for 3 hours; and thereby, the condensation reaction of the silane compound was promoted. After that, the resultant mixture was disintegrated and was passed through a sieve having had an opening of 100 μm, and a magnetic substance 1 was obtained as a coloring agent.

<Production Example of Polyester Resin 1>

A reaction apparatus equipped with a stirrer, a thermometer and a discharge cooler was charged with 20 parts of propylene oxide-modified bisphenol A (2 mol adduct), 80 parts of propylene oxide-modified bisphenol A (3 mol adduct), 20 parts of terephthalic acid, 20 parts of isophthalic acid, and 0.50 parts of tetrabutoxytitanium; and the mixture was subjected to an esterification reaction at 190° C.

After that, 1 part of trimellitic anhydride (TMA) was added thereto, the temperature was raised to 220° C., simultaneously, the pressure in the system was gradually reduced, the mixture was subjected to a polycondensation reaction at 150 Pa, and polyester resin 1 was obtained. An acid value of the polyester resin 1 was 12 mgKOH/g, and a softening point was 110° C.

<Production Example of Silica Fine Particle A1>

Untreated dry silica (BET specific surface area of 300 $m^2/g$) was charged into a reaction vessel, and was heated to 250° C. in a fluidized state by stirring. The inside of the reaction vessel was made to be under a nitrogen gas atmosphere, and 15.0 parts of dimethyldichlorosilane was sprayed onto 100 parts of the untreated dry silica with the use of a spray nozzle, and heating and stirring were continued for 1 hour to cause the mixture to be reacted; and thereby a silica fine particle A1 was obtained. Physical properties of the silica fine particle A1 are shown in Table 1-1 and 1-2.

<Production Examples of Silica Fine Particles A2 to A5 and A9 to A10>

Silica fine particles A2 to A5 and A9 to A10 were obtained in the same way as in the production example of the silica fine particle A1, except that the BET specific surface area of the untreated dry silica, the amount of charged dimethyldichlorosilane, the reaction temperature and the reaction time period were changed as shown in Table 1-1 and 1-2. Physical properties of the silica fine particles A2 to A5 and A9 to A10 are shown in Table 1-1 and 1-2.

<Production Example of Silica Fine Particle A6>

Untreated dry silica (BET specific surface area of 300 $m^2/g$) was charged into a reaction vessel, and was heated to 270° C. in a fluidized state by stirring. The inside of the reaction vessel was replaced with nitrogen gas, the reaction vessel was sealed, octamethylcyclotetrasiloxane as a first surface treatment agent was sprayed with the use of a spray nozzle until the gauge pressure reached 200 kPa, and the mixture was mixed. After that, heating and stirring were continued for 1 hour to cause the mixture to be reacted, then, the inside of the reaction vessel was replaced with a nitrogen gas atmosphere again, and a silica fine particle A6 was obtained. Physical properties of the silica fine particle A6 are shown in Table 1-1 and 1-2.

<Production Example of Silica Fine Particle A7 to A8>

Silica fine particles A7 to A8 were obtained in the same way as in the production example of the silica fine particle A1, except that the BET specific surface area of the untreated dry silica, the gauge pressure when octamethylcyclotetrasiloxane was charged, the reaction temperature and the reaction time period were changed as shown in Table 1-1 and 1-2. Physical properties of the silica fine particles A7 to A8 are shown in Table 1-1 and 1-2.

<Production Example of Silica Fine Particle A11>

Untreated dry silica (BET specific surface area of 30 $m^2/g$) was charged into a reaction vessel, and was heated to 300° C. in a fluidized state by stirring. The inside of the reaction vessel was made to be under a nitrogen gas atmosphere, and 5.0 parts of dimethyl silicone oil (KF-96-50CS, manufactured by Shin-Etsu Chemical Co., Ltd.) was sprayed onto 100 parts of the untreated dry silica with the use of a spray nozzle, and heating and stirring were continued for 1 hour to cause the mixture to be reacted; and thereby a silica fine particle A11 was obtained. Physical properties of the silica fine particle A11 are shown in Table 1-1 and 1-2.

<Production Example of Silica Fine Particle A12>

Untreated dry silica (BET specific surface area of 20 $m^2/g$) was charged into a reaction vessel, and was heated to 270° C. in a fluidized state by stirring. The inside of the reaction vessel was made to be under a nitrogen gas atmosphere, and 1.0 parts of hexamethyldisilazane was sprayed onto 100 parts of the untreated dry silica with the use of a spray nozzle, and heating and stirring were continued for 1 hour to cause the mixture to be reacted; and thereby a silica fine particle A12 was obtained. Physical properties of the silica fine particle A12 are shown in Table 1-1 and 1-2.

<Production Example of Silica Fine Particle A13>

Untreated dry silica (BET specific surface area of 30 $m^2/g$) was charged into a reaction vessel, and was heated to 270° C. in a fluidized state by stirring. The inside of the reaction vessel was made to be under a nitrogen gas atmosphere, and 1.5 parts of hexamethyldisilazane was sprayed onto 100 parts of the untreated dry silica with the use of a spray nozzle, and heating and stirring were continued for 1 hour to cause the mixture to be reacted to coat.

After treatment, the reactor was replaced with a nitrogen atmosphere and heated to 300° C. Subsequently, 5.0 parts of dimethyl silicone oil (KF-96-50CS, manufactured by Shin-Etsu Chemical Co., Ltd.) were spray-treated to 100 parts of the untreated dry silica, and the silica fine particles A13 were obtained by continuing heating and stirring for 1 hour and reacting. Physical properties of the silica fine particle A13 are shown in Table 1-1 and 1-2.

TABLE 1-1

Physical properties of the silica fine particles

| | Untreated silica fine particle BET/$m^2$/g | Surface treatment condition: Treatment agent | Treatment volume | Reaction time period/h | Reaction temperature/° C. |
|---|---|---|---|---|---|
| Silica fine particle A1 | 300 | Dimethyldichlorosilane | 15.0 parts by mass | 1 | 250 |
| Silica fine particle A2 | 200 | Dimethyldichlorosilane | 10.0 parts by mass | 1 | 250 |
| Silica fine particle A3 | 300 | Dimethyldichlorosilane | 23.0 parts by mass | 1 | 250 |
| Silica fine particle A4 | 300 | Dimethyldichlorosilane | 7.0 parts by mass | 1 | 200 |
| Silica fine particle A5 | 300 | Dimethyldichlorosilane | 7.0 parts by mass | 2 | 300 |
| Silica fine particle A6 | 300 | Octamethylcyclotetrasiloxane | 200 kPa | 1 | 270 |
| Silica fine particle A7 | 300 | Octamethylcyclotetrasiloxane | 250 kPa | 1 | 220 |
| Silica fine particle A8 | 25 | Octamethylcyclotetrasiloxane | 200 kPa | 1 | 270 |
| Silica fine particle A9 | 25 | Dimethyldichlorosilane | 1.3 parts by mass | 1 | 250 |
| Silica fine particle A10 | 20 | Dimethyldichlorosilane | 1.0 parts by mass | 1 | 250 |
| Silica fine particle A11 | 30 | Dimethyl silicone oil | 5.0 parts by mass | 1 | 250 |
| Silica fine particle A12 | 20 | Hexamethyldisilazane | 1.0 parts by mass | 1 | 250 |
| Silica fine particle A13 | 30 | Hexamethyldisilazane | 1.5 parts by mass | 1 | 270 |
| | | Dimethyl silicone oil | 5.0 parts by mass | 1 | 300 |

TABLE 1-2

Physical properties of the silica fine particles

| | Sn | $(D_{DD}/S_{DD})$/B | $(D_{CP}/S_{CP})$/B | (DDD/SDD)/ (DCP/SCP) | B/ $m^2$/g | Number-average particle size/nm |
|---|---|---|---|---|---|---|
| Silica fine particle A1 | 0.40 | $1.20 \times 10^{-4}$ | $1.30 \times 10^{-3}$ | $1.08 \times 10^{1}$ | 250 | 7 |
| Silica fine particle A2 | 0.38 | $1.00 \times 10^{-4}$ | $1.10 \times 10^{-3}$ | $1.10 \times 10^{1}$ | 175 | 14 |
| Silica fine particle A3 | 0.25 | $2.50 \times 10^{-4}$ | $2.00 \times 10^{-3}$ | $8.00 \times 10^{0}$ | 240 | 8 |
| Silica fine particle A4 | 0.80 | $4.70 \times 10^{-6}$ | $4.70 \times 10^{-4}$ | $1.00 \times 10^{2}$ | 270 | 5 |
| Silica fine particle A5 | 0.50 | $5.00 \times 10^{-6}$ | $1.50 \times 10^{-3}$ | $3.00 \times 10^{2}$ | 280 | 6 |
| Silica fine particle A6 | 0.17 | $6.60 \times 10^{-4}$ | $2.40 \times 10^{-3}$ | $3.64 \times 10^{0}$ | 240 | 8 |
| Silica fine particle A7 | 0.19 | $6.70 \times 10^{-4}$ | $2.00 \times 10^{-3}$ | $3.00 \times 10^{0}$ | 240 | 9 |
| Silica fine particle A8 | 0.14 | $1.40 \times 10^{-3}$ | $1.00 \times 10^{-2}$ | $7.14 \times 10^{0}$ | 20 | 50 |
| Silica fine particle A9 | 0.38 | $5.00 \times 10^{-4}$ | $9.00 \times 10^{-3}$ | $1.80 \times 10^{1}$ | 20 | 48 |
| Silica fine particle A10 | 0.36 | $5.20 \times 10^{-4}$ | $9.80 \times 10^{-3}$ | $1.88 \times 10^{1}$ | 15 | 60 |
| Silica fine particle A11 | 0.40 | $9.00 \times 10^{-3}$ | $9.40 \times 10^{-3}$ | $1.04 \times 10^{0}$ | 13 | 62 |
| Silica fine particle A12 | 0.18 | Not detected | Not detected | — | 15 | 58 |
| Silica fine particle A13 | 0.10 | $8.80 \times 10^{-3}$ | Not detected | $0.0 \times 10^{0}$ | 12 | 64 |

<Production Example of Titanium Compound Particle B (External Additive B)>

A titanium compound particle B was produced in the following way. To metatitanic acid obtained by a sulfate method, an aqueous solution of 50%-NaOH was added in an amount of 4 times the molar amount of $TiO_2$ as NaOH, and the mixture was heated at 95° C. for 2 hours. The resultant mixture was thoroughly washed, 31%-HCl was added to the mixture so that $HCl/TiO_2$ becomes 0.26, and the mixture was heated at the boiling point for 1 hour. After having been cooled, the resultant mixture was neutralized with 1 mol/L-NaOH to pH 7, then, the resultant liquid was washed and dried, and a fine particle titanium oxide was produced. A specific surface area of the obtained fine particle titanium oxide was 115 $g/m^2$. To 100 parts of the fine particle titanium oxide, 100 parts of NaCl and 25 parts of $Na_2P_2O_7 \cdot 10H_2O$ were added, the mixture was mixed for 1 hour with a vibrating ball-mill, and the mixture was calcined for 2 hours at 850° C. in an electric oven. The obtained calcined product was charged into pure water; and the mixture was heated therein at 80° C. for 6 hours, and then was washed to remove a soluble salt therefrom. All the particles obtained by drying were fine particle acicular titanium oxides (titanium compound particles B) of which minor axes were in a range of from 0.03 to 0.07 μm, and major axes were in a range of from 0.4 to 0.8 μm.

<Production Example of Toner Particle 1>

A toner particle was prepared according to the following procedure.

(Preparation of First Aqueous Medium)

Sodium phosphate dodecahydrate in an amount of 2.9 parts was charged to ion-exchanged water in an amount of 353.8 parts, and the mixture was heated to 60° C. while having been stirred with the use of a TK type homomixer (Tokushu Kika Kogyo Co., Ltd.), then, an aqueous solution of calcium chloride in which 1.7 parts of calcium chloride dihydrate was added to 11.7 parts of ion-exchanged water and an aqueous solution of magnesium chloride in which 0.5 parts of magnesium chloride was added to 15.0 parts of ion-exchanged water were added thereto, the mixture was stirred, and a first aqueous medium containing a dispersion stabilizer was obtained.

(Preparation of Polymerizable Monomer Composition)

| | |
|---|---|
| Styrene | 75.0 parts |
| n-Butyl acrylate | 25.0 parts |
| 1-6 Hexanediol diacrylate | 0.5 parts |
| Magnetic substance 1 | 95.0 parts |
| Polyester resin 1 | 3.0 parts |

The above materials were uniformly dispersed and mixed with the use of an attritor (manufactured by Mitsui Miike Chemical Machinery Co., Ltd.), the dispersion was then heated to 60° C., 15.0 parts of behenyl stearate wax (melting temperature of 68° C.) as an ester wax and 8.0 parts of paraffin wax (HNP-9, produced by Nippon Seiro Co., Ltd.) as a hydrocarbon wax were added thereto, mixed and dissolved, and a polymerizable monomer composition was obtained.

(Preparation of Second Aqueous Medium)

A second aqueous medium containing a dispersion stabilizer was obtained by charging 0.6 parts of sodium phosphate dodecahydrate into 166.8 parts of ion-exchanged water; heating the mixture to 60° C. while having stirred the mixture with the use of a paddle stirring blade; then adding an aqueous solution of calcium chloride, which was obtained by adding 0.3 parts of calcium chloride dihydrate to 2.3 parts of ion-exchanged water thereto; and stirring the mixture.

(Granulation)

The above polymerizable monomer composition was charged into the above first aqueous medium, and the granulation liquid was treated with the use of CAVITRON (manufactured by Eurotec Co., Ltd.) at a peripheral speed of a rotator of 29 m/s for 1 hour to be uniformly dispersed and mixed; furthermore, 7.0 parts of t-butyl peroxypivalate was charged as a polymerization initiator, and the mixture was subjected to granulation while having been stirred at a peripheral speed of 22 m/s for 10 minutes by CLEARMIX (manufactured by M Technique Co., Ltd.) under $N_2$ atmosphere at 60° C.; and a granulation liquid was obtained that contained droplets of the polymerizable monomer composition.

(Polymerization/Distillation/Drying/External Addition)

The above granulation liquid was charged into the above second aqueous medium, and the mixture was allowed to react at 74° C. for 3 hours while having been stirred by a paddle stirring blade. After the reaction ended, the mixture was heated to 98° C. and distilled for 3 hours, and a reaction slurry was obtained. After that, as a cooling step, water at 0° C. was charged to the reaction slurry, and the reaction slurry was cooled from 98 to 45° C. at a rate of 100° C./min, then was further heated, and kept at 50° C. for 3 hours.

After that, the reaction slurry was allowed to cool to 25° C. at room temperature. The reaction slurry was allowed to cool, was washed by addition of hydrochloric acid, was filtered and dried; and a toner particle 1-1 was obtained of which the weight-average particle size was 7.7 μm.

After that, the polyester resin 1 (17 parts) and the toner particles 1-1 (100 parts) were externally added and mixed while being heated to 48° C. with a FM10C (manufactured by Mitsui Miike Chemical Machinery Co., Ltd.), and a toner particle 1-2 was obtained. The cross section of the toner was observed; and as a result, a shell of the polyester resin 1 was formed, and the average thickness was 530 nm.

A 1% aqueous solution of sodium tetraborate decahydrate produced by Fujifilm Wako Pure Chemical Corporation was sprayed onto the toner particle 1-2 which was obtained in the above so that a boron content in the toner became 1.0 ppm. Furthermore, a 1% aqueous solution of sodium dodecylbenzenesulfonate (product name: NEOGEN RK (produced by Dai-ichi Kogyo Seiyaku Co., Ltd.)) was sprayed so that a content of dodecylbenzenesulfonic acid in the toner became 500 ppm, and the toner particle 1 was obtained.

To the toner particle 1 (100.0 parts) obtained in the above, the silica fine particle A1 (1.0 parts), the titanium compound particle B (1.0 parts), and a titanium oxide particle having a particle size of 150 nm (0.20 parts) were externally added, and the mixture was mixed with a FM10C (manufactured by Mitsui Miike Chemical Machinery Co., Ltd.). The external addition was performed under such conditions that an A0 blade was used as a lower blade, a distance between a deflector and a wall was set to 20 mm, an amount of charged toner particles was 2.0 kg, the number of rotations was 66.6 $s_{-1}$, the external addition time period was 10 minutes, a temperature of cooling water was 20° C., and a flow rate was 10 L/min.

After that, the resultant tonner particles were sieved with a mesh having an opening of 200 μm and the toner 1 was obtained.

<Production Example of Toner Particles 2 and 3>

In the production example of the toner particle 1-2, the toner particle 2 were obtained in the same manner except that the input amount of the polyester resin 1 was adjusted so that the thickness of the shell was 700 nm. The thickness of the shell was adjusted so that the thickness of the shell was 300 nm, and the toner particle 3 were obtained.

<Production Example of Toner Particles 4 to 18>

In the production example of the toner particle 1, the toner particles 4 to 18 were obtained in the same manner except that no polyester resin was added to the toner particle 1-1 and the dodecylbenzene sulfonic acid and boron contents were changed as shown in Table 2-1 to 2-4.

<Production Example of Toner 1>

To the toner particle 1 (100.0 parts) obtained in the above, the silica fine particle A1 (1.0 part), the titanium compound particle B (1.0 part) and a titanium oxide particle having a particle size of 150 nm (0.20 parts) were externally added, and the mixture was mixed with an FM10C (manufactured by Mitsui Miike Chemical Machinery Co., Ltd.). The external addition was performed under such conditions that an A0 blade was used as a lower blade, a distance between a deflector and a wall was set to 20 mm, an amount of charged toner particles was 2.0 kg, the number of rotations was 66.6 $s^{-1}$, the external addition time period was 10 minutes, a temperature of cooling water was 20° C., and a flow rate was 10 L/min.

After that, the resultant tonner particles were sieved with a mesh having an opening of 200 μm and the toner 1 was obtained.

<Production Example of Toner 2 to 31>

In the production example of the toner 1, the toner 2 to 31 were obtained in the same manner except that the toner particle used and the external preparation formula were changed as shown in Table 2-1 to 2-4.

Table 2-1

TABLE 2-1

Production example of toner 1 to 16

| Toner No. | Matrix | Silica fine particle A | Presence or absence of boron | Presence or absence of BO bonds | Presence or absence of dodecylbenzene sulfonic acid structure | Content of dodecylbenzene sulfonic acid structure/ppm | Content of Boron atom/ppm | Content of silica fine particle A/ parts by mass |
|---|---|---|---|---|---|---|---|---|
| Toner 1 | Toner particle 1 | Silica fine particle A1 | B detected | BO detected | Contain | 500 | 1.0 | 1.0 |
| Toner 2 | Toner particle 1 | Silica fine particle A2 | B detected | BO detected | Contain | 500 | 1.0 | 1.0 |
| Toner 3 | Toner particle 1 | Silica fine particle A3 | B detected | BO detected | Contain | 500 | 1.0 | 1.0 |
| Toner 4 | Toner particle 1 | Silica fine particle A4 | B detected | BO detected | Contain | 500 | 1.0 | 1.0 |
| Toner 5 | Toner particle 1 | Silica fine particle A5 | B detected | BO detected | Contain | 500 | 1.0 | 1.0 |
| Toner 6 | Toner particle 1 | Silica fine particle A6 | B detected | BO detected | Contain | 500 | 1.0 | 1.0 |
| Toner 7 | Toner particle 1 | Silica fine particle A7 | B detected | BO detected | Contain | 500 | 1.0 | 1.0 |
| Toner 8 | Toner particle 2 | Silica fine particle A1 | B detected | BO detected | Contain | 500 | 1.0 | 1.0 |
| Toner 9 | Toner particle 3 | Silica fine particle A1 | B detected | BO detected | Contain | 500 | 1.0 | 1.0 |
| Toner 10 | Toner particle 4 | Silica fine particle A1 | B detected | BO detected | Contain | 500 | 1.2 | 1.0 |
| Toner 11 | Toner particle 5 | Silica fine particle A1 | B detected | BO detected | Contain | 500 | 2.0 | 1.0 |
| Toner 12 | Toner particle 6 | Silica fine particle A1 | B detected | BO detected | Contain | 800 | 1.0 | 1.0 |
| Toner 13 | Toner particle 7 | Silica fine particle A1 | B detected | BO detected | Contain | 20 | 3.0 | 1.0 |
| Toner 14 | Toner particle 8 | Silica fine particle A1 | B detected | BO detected | Contain | 10 | 1.0 | 1.0 |
| Toner 15 | Toner particle 9 | Silica fine particle A1 | B detected | BO detected | Contain | 1000 | 1.0 | 1.0 |
| Toner 16 | Toner particle 10 | Silica fine particle A1 | B detected | BO detected | Contain | 1000 | 2.0 | 1.0 |

TABLE 2-2

Production example of toner 1 to 16

| Toner No. | Formula (7) | Formula (8) | Presence or absence of titanium compound particle B | Content of external additive B/mass | Formula (9) | Thickness of polyester resin/nm | Presence or absence of titanium compound particle C | Weight-average particle size of toner particle/μm |
|---|---|---|---|---|---|---|---|---|
| Toner 1 | $1.3 \times 10^{-3}$ | $3.8 \times 10^{5}$ | Contain | 1.0 | 1.0 | 530.0 | Contain | 8.7 |
| Toner 2 | $1.1 \times 10^{-3}$ | $4.5 \times 10^{5}$ | Contain | 1.0 | 1.0 | 530.0 | Contain | 8.7 |
| Toner 3 | $2.0 \times 10^{-3}$ | $2.5 \times 10^{5}$ | Contain | 1.0 | 1.0 | 530.0 | Contain | 8.7 |
| Toner 4 | $4.7 \times 10^{-4}$ | $1.1 \times 10^{6}$ | Contain | 1.0 | 1.0 | 530.0 | Contain | 8.7 |
| Toner 5 | $1.5 \times 10^{-3}$ | $3.3 \times 10^{5}$ | Contain | 1.0 | 1.0 | 530.0 | Contain | 8.7 |
| Toner 6 | $2.4 \times 10^{-3}$ | $2.1 \times 10^{5}$ | Contain | 1.0 | 1.0 | 530.0 | Contain | 8.7 |
| Toner 7 | $2.0 \times 10^{-3}$ | $2.5 \times 10^{5}$ | Contain | 1.0 | 1.0 | 530.0 | Contain | 8.7 |
| Toner 8 | $1.3 \times 10^{-3}$ | $3.8 \times 10^{5}$ | Contain | 5.0 | 5.0 | 700.0 | Contain | 9.0 |
| Toner 9 | $1.3 \times 10^{-3}$ | $3.8 \times 10^{5}$ | Contain | 0.5 | 0.5 | 300.0 | — | 8.2 |
| Toner 10 | $1.1 \times 10^{-3}$ | $3.8 \times 10^{5}$ | Contain | 10.0 | 8.3 | <10 | — | 7.7 |
| Toner 11 | $6.5 \times 10^{-4}$ | $3.8 \times 10^{5}$ | Contain | 0.1 | 0.05 | <10 | — | 7.7 |
| Toner 12 | $1.3 \times 10^{-3}$ | $6.2 \times 10^{5}$ | Contain | 10.0 | 10.0 | <10 | — | 7.7 |
| Toner 13 | $4.3 \times 10^{-4}$ | $1.5 \times 10^{4}$ | Contain | 0.1 | 0.03 | <10 | — | 7.7 |
| Toner 14 | $1.3 \times 10^{-3}$ | $7.7 \times 10^{3}$ | — | — | — | <10 | — | 7.7 |
| Toner 15 | $1.3 \times 10^{-3}$ | $7.7 \times 10^{5}$ | — | — | — | <10 | — | 7.7 |
| Toner 16 | $6.5 \times 10^{-4}$ | $7.7 \times 10^{5}$ | — | — | — | <10 | — | 7.7 |

TABLE 2-3

Production example of toner 17 to 31

| Toner No. | Matrix | Silica fine particle A | Presence or absence of boron | Presence or absence of BO bonds | Presence or absence of dodecylbenzene sulfonic acid structure | Content of dodecylbenzene sulfonic acid structure/ppm | Content of Boron atom/ppm | Content of silica fine particle A/ parts by mass |
|---|---|---|---|---|---|---|---|---|
| Toner 17 | Toner particle 11 | Silica fine particle A1 | B detected | BO detected | Contain | 1000 | 10.0 | 1.0 |
| Toner 18 | Toner particle 3 | Silica fine particle A6 | B detected | BO detected | Contain | 500 | 2.0 | 3.0 |
| Toner 19 | Toner particle 12 | Silica fine particle A1 | B detected | BO detected | Contain | 500 | 10.0 | 0.2 |

TABLE 2-3-continued

Production example of toner 17 to 31

| Toner No. | Matrix | Silica fine particle A | Presence or absence of boron | Presence or absence of BO bonds | Presence or absence of dodecylbenzene sulfonic acid structure | Content of dodecylbenzene sulfonic acid structure/ppm | Content of Boron atom/ppm | Content of silica fine particle A/ parts by mass |
|---|---|---|---|---|---|---|---|---|
| Toner 20 | Toner particle 13 | Silica fine particle A6 | B detected | BO detected | Contain | 500 | 0.5 | 3.5 |
| Toner 21 | Toner particle 14 | Silica fine particle A1 | B detected | BO detected | Contain | 500 | 25.0 | 0.1 |
| Toner 22 | Toner particle 13 | Silica fine particle A8 | B detected | BO detected | Contain | 500 | 0.5 | 1.5 |
| Toner 23 | Toner particle 13 | Silica fine particle A9 | B detected | BO detected | Contain | 500 | 0.5 | 1.5 |
| Toner 24 | Toner particle 13 | Silica fine particle A10 | B detected | BO detected | Contain | 500 | 0.5 | 2.0 |
| Toner 25 | Toner particle 15 | Silica fine particle A10 | B detected | BO detected | Contain | 500 | 0.1 | 2.0 |
| Toner 26 | Toner particle 16 | Silica fine particle A10 | B detected | BO detected | Contain | 500 | 100.0 | 0.1 |
| Toner 27 | Toner particle 17 | Silica fine particle A10 | — | — | Contain | 500 | 0.0 | 2.0 |
| Toner 28 | Toner particle 18 | Silica fine particle A10 | B detected | BO detected | — | 0.00 | 0.1 | 2.0 |
| Toner 29 | Toner particle 15 | Silica fine particle A11 | B detected | BO detected | Contain | 500 | 0.1 | 2.0 |
| Toner 30 | Toner particle 15 | Silica fine particle A12 | B detected | BO detected | Contain | 500 | 0.1 | 2.0 |
| Toner 31 | Toner particle 15 | Silica fine particle A13 | B detected | BO detected | Contain | 500 | 0.1 | 2.0 |

TABLE 2-4

Production example of toner 17 to 31

| Toner No. | Formula (7) | Formula (8) | Presence or absence of titanium compound particle B | Content of external additive A/mass | Formula (9) | Thickness of polyester resin/nm | Presence or absence of titanium compound particle C | Weight-average particle size of toner particle/μm |
|---|---|---|---|---|---|---|---|---|
| Toner 17 | $1.3 \times 10^{-4}$ | $7.7 \times 10^{5}$ | — | — | — | <10 | — | 7.7 |
| Toner 18 | $3.6 \times 10^{-3}$ | $6.9 \times 10^{4}$ | — | — | — | <10 | — | 7.7 |
| Toner 19 | $2.6 \times 10^{-5}$ | $1.9 \times 10^{6}$ | — | — | — | <10 | — | 7.7 |
| Toner 20 | $1.7 \times 10^{-2}$ | $6.0 \times 10^{4}$ | — | — | — | <10 | — | 7.7 |
| Toner 21 | $5.2 \times 10^{-6}$ | $3.8 \times 10^{6}$ | — | — | — | <10 | — | 7.7 |
| Toner 22 | $3.0 \times 10^{-2}$ | $3.3 \times 10^{4}$ | — | — | — | <10 | — | 7.7 |
| Toner 23 | $2.7 \times 10^{-2}$ | $3.7 \times 10^{4}$ | — | — | — | <10 | — | 7.7 |
| Toner 24 | $3.9 \times 10^{-2}$ | $2.6 \times 10^{4}$ | — | — | — | <10 | — | 7.7 |
| Toner 25 | $2.0 \times 10^{-1}$ | $2.6 \times 10^{4}$ | — | — | — | <10 | — | 7.7 |
| Toner 26 | $9.8 \times 10^{-6}$ | $5.1 \times 10^{5}$ | — | — | — | <10 | — | 7.7 |
| Toner 27 | — | $2.6 \times 10^{4}$ | — | — | — | <10 | — | 7.7 |
| Toner 28 | $2.0 \times 10^{-1}$ | $0.0 \times 10^{0}$ | — | — | — | <10 | — | 7.7 |
| Toner 29 | $1.9 \times 10^{-1}$ | $2.7 \times 10^{4}$ | — | — | — | <10 | — | 7.7 |
| Toner 30 | 0 | — | — | — | — | <10 | — | 7.7 |
| Toner 31 | 0 | — | — | — | — | <10 | — | 7.7 |

Example 1

The following evaluations were performed with the use of the toner 1. When the toner 1 was evaluated by an actual machine, an image output testing machine (TIP Laser Jet Enterprise M609dn) was used after the process speed was converted to 410 mm/sec.

In addition, as paper for evaluation, Vitality (produced by Xerox Co., Ltd, basis weight of 75 g/cm$^2$, and letter size) was used. The evaluation results are shown in Table 3-1 and 3-2.

<Evaluation of Charge Rising Property>

Two plastic bottles of 50 mL each with a lid were prepared, into which 19.0 g of a magnetic carrier F813-300 (manufactured by Powdertech Co., Ltd.) and 1.0 g of the toner for evaluation were charged, and were left at rest in a harsh environment (temperature of 40° C. and humidity of 95% RH) for 30 days. After that, the plastic bottles were left at rest for 1 day in a low-temperature and low-humidity environment (temperature of 15° C. and humidity of 10% RH). After that, the following operation was performed under a high-temperature and high-humidity environment (temperature of 32.5° C. and humidity of 80% RH).

The two plastic bottles were shaken for 2 minutes and 10 minutes at a speed of 4 reciprocations per second by a shaker (YS-LD: manufactured by YAYOI Co., Ltd.), respectively, and thereby, two component developers were prepared.

The two component developer in an amount of 0.200 g, of which the triboelectric charge amount is to be measured, is charged into a measurement vessel 2 which is made from metal and has a screen 3 of 500 mesh (opening of 25 μm) at the bottom thereof as illustrated in FIGURE, and the vessel is covered with a metal lid 4. The mass of the whole measurement vessel 2 at this time is measured, and is assumed to be W1 (g).

Next, in a suction apparatus 1 (in which at least a portion in contact with the measurement vessel 2 is an insulating material), an air is sucked from the suction port 7, and a pressure of a vacuum gauge 5 is set to 50 mmAq by an air flow rate adjustment valve 6 being adjusted. In this state, the toner is sucked for 1 minute, and is removed.

An electric potential of the electrometer 9 at this time is assumed to be V (volt). Here, reference numeral 8 denotes a capacitor, and the capacitance is assumed to be C (μF). The mass of the whole measurement vessel after suction is measured, and is assumed to be W2 (g). The triboelectric charge amount of the toner is calculated by the following Expression.

$$\text{Triboelectric charge amount (mC/kg)} = (C \times V)/(W1 - W2)$$

The "triboelectric charge amount after shaking for 2 minutes"/"triboelectric charge amount after shaking for 10 minutes"×100 was calculated, and the result was regarded as the charge rising property, which was evaluated according to the following criteria.

A: The charge rising property is 90% or higher.

B: The charge rising property is 80% or higher to lower than 90%

C: The charge rising property is 70% or higher to lower than 80%

D: The charge rising property is 60% or higher to lower than 70%

E: The charge rising property is lower than 60%

<Evaluation of Density Unevenness in Longitudinal Direction and Density Uniformity>

The image output testing machine (above-mentioned HP Laser Jet Enterprise M609dn) and a toner cartridge filled with an evaluation toner were left to stand for 1 day or longer in a low-temperature and low-humidity environment (temperature of 15° C. and humidity of 10% RH), and then a horizontal line pattern in which horizontal lines of 3 dots were printed at intervals of 180 dot spaces was printed on 4000 sheets in an intermittent mode (8 seconds pause every time after 2 sheets printing) by the image output testing machine. Immediately after the end, a halftone (30H) image and an entire solid black image were output. For information, the 30H image is such a value that 256 gradations are indicated by hexadecimal, and is a halftone image at the time when OOH is solid white (non-image) and FFH is solid black (entire image).

The obtained halftone image was visually checked for the presence or absence of the density unevenness (a portion at which the density was low in a longitudinal band) in the longitudinal direction. In addition, 9 points were uniformly selected from the whole of the obtained entire solid black image, and the reflection densities were measured with the use of a Macbeth densitometer (manufactured by GretagMacbeth AG) which is a reflection densitometer, and of an SPI filter. The difference between the maximum and minimum values of the 9 points was calculated, and was determined to be the maximum density difference. The density unevenness in the longitudinal direction and the density uniformity were evaluated according to the following criteria.

A: The density unevenness in the longitudinal direction is not observed, and the maximum density difference is smaller than 0.04.

B: The density unevenness in the longitudinal direction is not observed, and the maximum density difference is 0.04 or more and less than 0.08.

C: The density unevenness in the longitudinal direction is not observed, and the maximum density difference is 0.08 or more.

D: The density unevenness in the longitudinal direction can be observed, and the maximum density difference is smaller than 0.15.

E: The density unevenness in the longitudinal direction can be observed, and the maximum density difference is 0.15 or more.

<Evaluation of Density Retention Rate Before and After Durability>

The image output testing machine and a toner cartridge filled with an evaluation toner were left to stand for 1 day or longer in a low-temperature and low-humidity environment (temperature of 15° C. and humidity of 10% RH), and then a horizontal line pattern in which horizontal lines of 3 dots were printed at intervals of 180 dot spaces was printed on 10000 sheets in an intermittent mode (8 seconds pause every time after 2 sheets printing) by the image output testing machine. Before and after printing of 10000 sheets, entire solid black images were each output, 9 points were uniformly selected from the whole of the obtained entire solid black images, and the reflection densities were each measured with the use of a Macbeth densitometer (manufactured by GretagMacbeth AG) which is a reflection densitometer, and of an SPI filter.

[(Initial average density of 9 points)/(average density of 9 points after printing of 10000 sheets)]×100 was calculated, and the density retention rate before and after durability was evaluated according to the following criteria.

A: 96% or higher

B: 91% or higher to lower than 96%

C: 81% or higher to lower than 91%

D: 76% or higher to lower than 81%

E: lower than 76%

Examples 2 to 26

Evaluation was made in the same way as in Example 1 except that toners 2 to 26 were used. The evaluation results are shown in Table 3-1 and 3-2.

Comparative Examples 1 to 5

Evaluation was made in the same way as in Example 1 except that toners 27 to 31 were used. The evaluation results are shown in Table 3-1 and 3-2.

TABLE 3-1

| Evaluation results | | | | | | | | |
|---|---|---|---|---|---|---|---|---|
| | | | | Density unevenness in the longitudinal direction | | | | |
| | Toner No. | Charge rising property | | Rank | Maximum density difference | Density retention rate before and after durability | | |
| Example 1 | Toner 1 | A | 96% | A | 0.02 | A | 98% |
| Example 2 | Toner 2 | A | 94% | A | 0.01 | A | 99% |
| Example 3 | Toner 3 | A | 97% | A | 0.03 | A | 97% |
| Example 4 | Toner 4 | A | 98% | B | 0.06 | A | 97% |
| Example 5 | Toner 5 | A | 97% | A | 0.02 | A | 98% |
| Example 6 | Toner 6 | B | 88% | A | 0.02 | A | 97% |
| Example 7 | Toner 7 | B | 88% | A | 0.03 | A | 96% |
| Example 8 | Toner 8 | A | 95% | A | 0.03 | A | 97% |
| Example 9 | Toner 9 | A | 95% | A | 0.03 | A | 96% |
| Example 10 | Toner 10 | A | 97% | A | 0.02 | B | 93% |
| Example 11 | Toner 11 | A | 95% | A | 0.03 | B | 91% |
| Example 12 | Toner 12 | B | 87% | A | 0.03 | B | 93% |
| Example 13 | Toner 13 | A | 95% | B | 0.05 | B | 91% |
| Example 14 | Toner 14 | A | 96% | B | 0.05 | C | 85% |
| Example 15 | Toner 15 | A | 95% | B | 0.05 | C | 85% |
| Example 16 | Toner 16 | A | 94% | B | 0.07 | C | 85% |

TABLE 3-2

| Evaluation results | | | | | | | |
|---|---|---|---|---|---|---|---|
| | | | | Density unevenness in the longitudinal direction | | | |
| | Toner No. | Charge rising property | | Rank | Maximum density difference | Density retention rate before and after durability | |
| Example 17 | Toner 17 | A | 92% | B | 0.09 | C | 85% |
| Example 18 | Toner 18 | A | 92% | B | 0.07 | C | 84% |
| Example 19 | Toner 19 | A | 92% | B | 0.09 | C | 83% |
| Example 20 | Toner 20 | A | 93% | C | 0.10 | C | 83% |
| Example 21 | Toner 21 | B | 86% | B | 0.07 | C | 81% |
| Example 22 | Toner 22 | B | 81% | B | 0.07 | C | 83% |
| Example 23 | Toner 23 | B | 83% | B | 0.06 | C | 83% |
| Example 24 | Toner 24 | C | 75% | B | 0.07 | D | 80% |
| Example 25 | Toner 25 | C | 72% | C | 0.11 | D | 77% |
| Example 26 | Toner 26 | C | 74% | B | 0.04 | D | 76% |
| Comparative example 1 | Toner 27 | D | 64% | E | 0.18 | E | 75% |
| Comparative example 2 | Toner 28 | D | 64% | E | 0.21 | E | 75% |
| Comparative example 3 | Toner 29 | E | 55% | C | 0.12 | E | 70% |
| Comparative example 4 | Toner 30 | E | 58% | D | 0.14 | E | 75% |
| Comparative example 5 | Toner 31 | E | 55% | C | 0.15 | E | 70% |

According to the toner of the present invention, a stable image can be formed even in the low print intermittent mode under the low-temperature and low-humidity environment, while the toner has excellent charge rising property.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-010019, filed Jan. 26, 2023, which is hereby incorporated by reference herein in its entirety.

What is claimed is:

1. A toner comprising: a toner particle comprising a binder resin; and a silica fine particle A, wherein (I) in TOF-SIMS measurement of the toner particle, a fragment peak derived from a boron atom and a fragment peak derived from a boron-oxygen structure are detected, and the toner comprises at least one selected from the group consisting of dodecylbenzenesulfonic acid and a dodecylbenzenesulfonate;

(II) in TOF-SIMS measurement of the silica fine particle A, a fragment ion is observed which corresponds to a structure shown by the following Formula (1), (1)

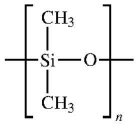

(wherein n represents an integer of 1 or more);

when 2.00 g of the silica fine particle is dispersed in a mixed liquid of 25.0 g of ethanol and 75.0 g of an aqueous solution of 20% by mass of NaCl, and the dispersion is subjected to a titration operation which uses sodium hydroxide, Sn defined by Sn=[(a−b)×c×NA]/(d×e) satisfies the following Expression (2), $$0.10 \le Sn \le 0.80 \ \ldots, \qquad (2)$$

(wherein a is a titration amount (L) of the aqueous solution of NaOH necessary for adjusting the mixed liquid in which the silica fine particle A is dispersed, to pH 9.0, b is the titration amount (L) of the aqueous solution of NaOH necessary for adjusting the mixed liquid of 25.0 g of ethanol and 75.0 g of the aqueous solution of 20% by mass of NaCl, to pH 9.0, c is a concentration (mol/L) of the aqueous solution of NaOH used for the titration, NA is Avogadro's number, d is a mass (g) of the silica fine particle, and e is a BET specific surface area ($nm^2/g$) of the silica fine particle);

in a chemical shift of the silica fine particle A obtained by a solid-state $^{29}$Si-NMR DD/MAS method, when $D_{DD}$ represents a peak area of a D unit having a peak top in a range of −25 ppm to −15 ppm, $S_{DD}$ represents a sum of peak areas of an M unit, a D unit, a T unit and a Q unit in a range of from −140 to 100 ppm, and B ($m^2/g$) represents a BET specific surface area of the silica fine particle, a value $(D_{DD}/S_{DD})/B$ of a ratio of $(D_{DD}/S_{DD})$ to B is from $4.70\times10^{-6}$ to $1.40\times10^{-1}$; and furthermore in a chemical shift of the silica fine particle A obtained by a solid-state $^{29}$Si-NMR CP/MAS method, when $D_{CP}$ represents a peak area of the D unit having a peak top in the range of from −25 to −15 ppm, and $S_{CP}$ represents a sum of peak areas of the M unit, the D unit, the T unit and the Q unit in a range of from −140 to 100 ppm, a value $(D_{CP}/S_{CP})/B$ of a ratio of $(D_{CP}/S_{CP})$ to B is from $4.70\times10^{-4}$ to $1.00\times10^{-2}$, and a value $(D_{CP}/S_{CP})/(D_{DD}/S_{DD})$ of a ratio of $(D_{CP}/S_{CP})$ to $(D_{DD}/S_{DD})$ is from 3.00 to $3.00\times10^{2}$.

2. The toner according to claim 1, wherein a content (based on mass) of the dodecylbenzenesulfonic acid or the dodecylbenzenesulfonate is from 10 to 1000 ppm with respect to the toner.

3. The toner according to claim 1, wherein an abundance of boron atoms (based on mass) obtained when the toner is measured by an inductively coupled plasma mass spectrometry (ICP-MS) is from 0.1 to 100 ppm.

4. The toner according to claim 1, wherein a number-average particle size of a primary particle of the silica fine particle A is from 5 to 50 nm smaller.

5. The toner according to claim 1, wherein a content of the silica fine particle A in the toner is from 0.2 to 2.0 parts by mass with respect to 100 parts by mass of the toner particle.

6. The toner according to claim 1, wherein a BET specific surface area of the silica fine particle A is from 15 to 300 $m^2/g$.

7. The toner according to claim 1, wherein a relationship between an abundance of boron atoms in the toner (based on mass) $I_B$ [ppm] and a content $S_A$ [parts by mass] of the silica fine particle A in the toner, and $(D_{CP}/S_{CP})/B$ satisfies the following Expression (7):

$$2.6\times10^{-5} \le [(D_{CP}/S_{CP})/B]\times S_A/I_B \le 3.6\times10^{-3} \ \ldots. \qquad (7)$$

8. The toner according to claim 1, wherein a relationship among a content (based on mass) D [ppm] of the dodecylbenzenesulfonic acid or the dodecylbenzenesulfonate, the content $S_A$ [parts by mass] of the silica fine particle A in the toner and $(D_{CP}/S_{CP})/B$ satisfies the following Expression (8):

$$7.7\times10^{3} \le D/[(D_{CP}/S_{CP})/B]\times S_A \le 1.9\times10^{6} \ \ldots. \qquad (8)$$

9. The toner according to claim 1, wherein the toner comprises a titanium compound particle B having a major axis of from 300 to 3000 nm and an aspect ratio of from 5.0 to 50.0.

10. The toner according to claim 9, wherein a relationship between an abundance of boron atoms (based on mass) $I_B$ [ppm] in the toner and a content T [% by mass] of the titanium compound particle B in the toner satisfies the following Expression (9):

$$5.0\times10^{-2} \le T/I_B \le 8.3 \ \ldots. \qquad (9)$$

11. The toner according to claim 1, wherein the toner particle has a polyester resin in a surface layer of the toner particle, and the surface layer has a thickness of from 300 to 700 nm.

* * * * *